United States Patent [19]

Patsch et al.

[11] 4,451,398
[45] May 29, 1984

[54] DYES CONTAINING IMIDAZOLYMETHYLENE GROUPS

[75] Inventors: Manfred Patsch, Wachenheim; Manfred Ruske, Ludwigshafen, both of Fed. Rep. of Germany

[73] Assignee: BASF Aktiengesellschaft, Ludwigshafen, Fed. Rep. of Germany

[21] Appl. No.: 233,479

[22] Filed: Feb. 11, 1981

[30] Foreign Application Priority Data

Feb. 18, 1980 [DE] Fed. Rep. of Germany ....... 3006013
Nov. 26, 1980 [DE] Fed. Rep. of Germany ....... 3044563

[51] Int. Cl.³ .................. C09B 1/00; C09B 15/00; C09B 25/00; C09B 29/00
[52] U.S. Cl. ................... 260/154; 8/657; 8/658; 8/677; 8/691; 8/692; 8/693; 8/919; 162/162; 260/147; 260/155; 260/156; 260/157; 260/158; 260/239.3 R; 260/245.72; 544/98; 544/208; 544/339; 546/30; 546/32; 546/33; 546/37; 546/42; 546/49; 546/101; 546/111; 548/148; 548/335; 548/336; 548/341; 548/345; 548/357; 548/359
[58] Field of Search ............... 260/157, 154, 158, 155, 260/314.5, 372, 147, 378, 156, 239.3 R, 314.5, 245.72; 548/148, 149, 345, 346, 336, 341, 335, 357, 387; 544/98, 209, 339; 546/101, 111, 49, 32, 38, 42, 33, 37

[56] References Cited

U.S. PATENT DOCUMENTS

| 2,301,532 | 11/1942 | Fell ........................ 260/157 X |
| 2,863,859 | 12/1958 | Shreve et al. ............. 260/157 |
| 2,905,667 | 9/1959 | Siegrist et al. ............ 260/157 X |
| 3,565,570 | 2/1971 | Dien ....................... 260/314.5 |
| 3,592,806 | 7/1971 | Iizuka et al. .............. 260/157 |
| 4,013,631 | 3/1977 | Wolfrum et al. .......... 260/157 |

FOREIGN PATENT DOCUMENTS

| 14677 | 1/1980 | European Pat. Off. ........... 260/157 |
| 14678 | 1/1980 | European Pat. Off. ........... 260/157 |
| 1569848 | 12/1969 | Fed. Rep. of Germany ... 260/314.5 |
| 2046785 | 3/1972 | Fed. Rep. of Germany ...... 260/157 |
| 2141987 | 2/1973 | Fed. Rep. of Germany ...... 260/157 |
| 2508892 | 2/1974 | Fed. Rep. of Germany ... 260/314.5 |
| 2508884 | 9/1976 | Fed. Rep. of Germany ...... 260/157 |
| 1323153 | 4/1962 | France ....................... 260/157 |
| 1567970 | 12/1967 | France ....................... 260/157 |
| 54-95628 | 7/1979 | Japan ........................ 260/157 |
| 1249468 | 10/1971 | United Kingdom ......... 260/157 |

Primary Examiner—Floyd D. Higel
Attorney, Agent, or Firm—Oblon, Fisher, Spivak, McClelland & Maier

[57] ABSTRACT

Dyes of the formula

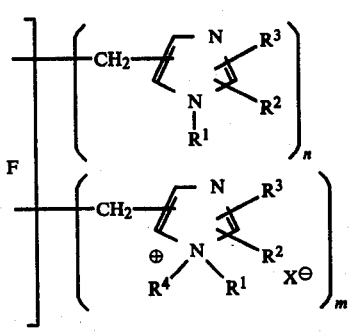

(I)

where $R^1$ is hydrogen, $C_1$–$C_6$-alkyl or $C_2$–$C_6$-alkenyl, $R^2$ and $R^3$ independently of one another are hydrogen, $C_1$–$C_5$-alkyl or $C_2$–$C_5$-alkenyl, $R^4$ is $C_1$–$C_{12}$-alkyl or hydroxy-$C_2$–$C_4$-alkyl, $X^\ominus$ is one equivalent of an anion, m is from 0 to 5 and n is from 0 to 5, with $1 \leq (m+n) \leq 5$, and F is an (m+n)-valent radical of a monoazo dye, a disazo dye, a polyazo dye, a quinophthalone, a bis-dioxazine, a compound of the 5,6-arylo-2-pyrone series, a naphtholactam dye, a triphenylmethane dye, a xanthene dye, a phthalocyanine, an indigoid, an anthraquinone dye containing one or more phenyl or naphthyl groups, a more highly fused carbonyl-containing dye, a quinacridone, a perylene-3,4,9,10-tetracarboxylic acid diimide, an anthrapyrimidine, a pyrazoloanthrone, a diaminonaphthoquinone, a naphthazarine or a naphthalene-1,4,5,8-tetracarboxylic acid diimide.

The dyes give brilliant wet-fast colorations on cellulose-containing fiber material, especially on paper. When used for wet-end coloring of paper, the waste water is virtually or completely colorless.

10 Claims, No Drawings

DYES CONTAINING IMIDAZOLYMETHYLENE GROUPS

The present invention relates to novel dyes containing imidazolylmethylene groups, and to their use.

The novel dyes have the general formula I

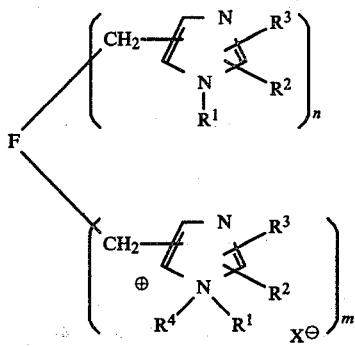

where $R^1$ is hydrogen, $C_1$–$C_6$-alkyl or $C_2$–$C_6$-alkenyl, $R^2$ and $R^3$ independently of one another are hydrogen, $C_1$–$C_5$-alkyl or $C_2$–$C_5$-alkenyl, $R^4$ is $C_1$–$C_{12}$-alkyl or hydroxy-$C_2$–$C_4$-alkyl, $X^\ominus$ is one equivalent of an anion, F is an (m+n)-valent radical of a monoazo dye, a disazo dye, a polyazo dye, a quinophthalone, a bis-dioxazine, a compound of the 5,6-arylo-2-pyrone series, a naphtholactam dye, a triphenylmethane dye, a xanthene dye, a phthalocyanine, an indigoid, an anthraquinone dye containing one or more phenyl or naphthyl groups, a more highly fused carbonyl-containing dye, a quinacridone, a perylene-3,4,9,10-tetracarboxylic acid diimide, an anthrapyrimidine, a pyrazoloanthrone, a diaminonaphthoquinone, a naphthazerine or a naphthalene-1,4,5,8-tetracarboxylic acid diimide, m is from 0 to 5 and n is from 0 to 5, with $1 \leq (m+n) \leq 5$.

In the form of their salts, the novel compounds of the formula (I) are readily soluble in water, whilst in the form of their bases they are readily soluble in dilute acids, such as acetic acid, hydroxyacetic acid, propionic acid, lactic acid and methanesulfonic acid.

Examples of suitable salts are the zinc double salts, the benzenesulfonates, the $C_1$–$C_{20}$-alkylbenzenesulfonates, the methylsulfates, the ethylsulfates, the chlorides and the sulfates.

The compounds of the formula (I) in the form of quaternary ammonium salts have good or very good solubility in water.

The dyes may be used as cationic dyes for coloring cellulose fiber materials, and in particular for the wet-end coloring of paper. Paper colored with the novel dyes is very fast to bleeding. On the other hand certain colorations, for example with dyes where F is a phthalocyanine radical, can be decolorized with sodium hypochlorite, which is advantageous when reprocessing waste paper. When using the novel dyes for the manufacture of colored paper, the waste water is virtually or completely colorless.

Specific examples of substituents $R^1$ other than hydrogen are hexyl, pentyl, butyl, propyl, ethyl, methyl, allyl and vinyl. Preferred meanings of $R^1$ are hydrogen and $C_1$–$C_4$-alkyl, especially hydrogen, methyl and ethyl.

Examples of meanings which $R^2$ and $R^3$ may have, independently of one another, are hydrogen, methyl, ethyl, propyl, butyl, pentyl, vinyl and allyl. Preferably, $R^2$ is hydrogen or $C_1$–$C_4$-alkyl, whilst $R^3$ is preferably hydrogen. $R^4$ is $C_1$–$C_{12}$-alkyl or hydroxy-$C_2$–$C_4$-alkyl, preferably $C_1$–$C_4$-alkyl, eg. butyl, propyl and especially ethyl, methyl or hydroxy-$C_2$–$C_4$-alkyl. Specific examples of $X^\ominus$ are benzenesulfonate, o- or p-toluenesulfonate, $CH_3O$—$SO_3^\ominus$, $C_2H_5$—$O$—$SO_3^\ominus$, $Cl^\ominus$, $\frac{1}{2}SO_4^{2\ominus}$ and $\frac{1}{2}ZnCl_4^{2\ominus}$.

Where (m+n)>1, the dyes may be in the form of mixtures of dyes where m+n is 1, 2, 3 and/or 4, and the mean values of m and n may also each be nonintegers.

Preferably, (m+n) is from 1 to 4 and in that case m or n may also be 0 (zero). Dyes where n is from 1 to 4 and m is 0 are particularly preferred.

Examples of (m+n)-valent dye radicals F are those derived from (1) monoazo, disazo or polyazo dyes,
(2) quinophthalone,
(3) bis-dioxazine,
(4) compounds of the 5,6-arylo-2-pyrone series,
(5) naphtholactam dyes,
(6) triphenylmethane and xanthene dyes,
(7) phthalocyanine,
(8) indigoids,
(9) anthraquinone dyes containing phenyl or naphthyl groups,
(10) more highly fused carbonyl-containing dyes and
(11) carbonyl-containing dyes such as quinacridone and its derivatives, perylene-3,4,9,10-tetracarboxylic acid diimide and its derivatives, naphthalene-1,4,5,8-tetracarboxylic acid diimide derivatives, naphthazarine (5,8-dihydroxynaphthoquinone-1,4) derivatives, diaminonaphthoquinone derivatives, anthrapyrimidine derivatives and pyrazoloanthrone derivatives.

The novel dyes I are based on dyes of the general formula II $$F(H)_{m+n} \qquad (II)$$

The dyes II must be capable of undergoing amidomethylation. The dyes II are known or may be prepared by conventional methods.

(1) Examples of suitable azo and disazo dyes are those mentioned in German Laid-Open Application DOS No. 2,810,246, pages 30–32. These azo compounds essentially belong to two groups, namely:

(1.1) compounds in which the aromatic carbocyclic monoamine or diamine is coupled to a carbocyclic or heterocyclic compound in the o-position to a hydroxyl group;

(1.2) compounds which are obtained by coupling aromatic carbocyclic monoamines or diamines or aminoazobenzene, which may be substituted yet further, to aromatic or heterocyclic amines or to compounds possessing an enolizable ketomethylene group, for example acetoacetic acid arylamides or pyrazolones.

The azo dyes are identified in the manner conventionally employed in this field, by stating the amine on which the diazo component is based, and stating the coupling component, the arrow pointing to the coupling component: for example, aniline→β-naphthol.

Examples of azo compounds of groups 1.1 and 1.2 are:

(1.1)

4-methoxyaniline→β-naphthol,
3,3'-dimethoxy-4,4'-diaminodiphenyl→β-naphthol,
bis-(4-aminophenyl)-disulfide→β-naphthol, bis-(3-amino-4-methoxyphenyl)-sulfone→β-naphthol,
bis-(3-amino-4-methyl-phenyl)-sulfone→β-naphthol,
4,4'-diaminobenzanilide→β-naphthol,
bis-(4-aminophenyl)-sulfone→3-hydroxy-2-naphthanilide,
aniline→3-hydroxy-2-naphthanilide,
2-methoxyaniline→3-hydroxy-4'-chloro-2-naphthanilide,
3-methoxyaniline→3-hydroxy-4'-chloro-2-naphthanilide,
2-chloroaniline→3-hydroxy-4'-chloro-2-naphthanilide,
4-methoxyaniline→3-hydroxy-2-naphth-o-anisidide,
2-chloroaniline→3-hydroxy-2-naphth-o-anisidide,
4-chloroaniline→3-hydroxy-2-naphth-o-anisidide,
5-(N-phenylsulfamyl)-2-methoxyaniline→3-hydroxy-2-naphth-o-anisidide,
bis-(4-aminophenyl)-sulfone→3-hydroxy-2-naphth-o-anisidide,
bis-(3-amino-4-methoxyphenyl)-sulfone→3-hydroxy-2-naphth-o-anisidide,
3,4'-diaminobenzanilide→3-hydroxy-2-naphth-o-anisidide,
3',4-diaminobenzanilide→3-hydroxy-2-naphth-o-anisidide,
3,3'-dimethoxy-4,4'-diaminodiphenyl→3-hydroxy-2-naphth-o-anisidide,
aniline→3-hydroxy-2-naphth-o-anisidide,
2-methoxyaniline→3-hydroxy-2-naphth-o-anisidide,
aniline→3-hydroxy-5'-chloro-2-naphth-o-anisidide,
o-toluidine→3-hydroxy-5'-chloro-2-naphth-o-anisidide,
2-methoxyaniline→3-hydroxy-2-naphth-o-toluidide,
2-chloroaniline→3-hydroxy-2-naphth-o-toluidide,
4-bromo-2-chloroaniline→3-hydroxy-2-naphth-o-toluidide,
bis-(3-amino-4-methoxyphenyl)-sulfone→3-hydroxy-2-naphth-o-toluidide,
bis-(3-amino-4-methylphenyl)-sulfone→3-hydroxy-2-naphth-o-toluidide,
bis-(4-aminophenyl)-disulfide→3-hydroxy-2-naphth-o-toluidide,
4-bromo-3-methylaniline→4'-chloro-3-hydroxy-2-naphth-o-toluidide,
3-ethylaniline→3'-chloro-3-hydroxy-2-naphth-o-toluidide,
bis-(4-aminophenyl)-disulfide→3-hydroxy-2-naphth-o-phenetidide,
aniline→3-hydroxy-2-naphth-o-phenetidide,
o-toluidine→3-hydroxy-2-naphth-o-phenetidide,
2-methoxyaniline→3-hydroxy-2-naphth-o-phenetidide,
3-iodoaniline→4'-chloro-3-hydroxy-2',5'-dimethoxy-2-naphthanilide,
4-isopropylaniline→3-hydroxy-2-naphth-2,4-xylidide,
2,5-dimethoxyaniline→3'-chloro-3-hydroxy-2-naphth-o-anisidide,
2,4-difluoroaniline→3-hydroxy-2'-methyl-2-naphth-p-anisidide,
3,4-diethoxyaniline→5'-chloro-3-hydroxy-2',4'-dimethoxy-2-naphthanilide,
2-methoxyaniline→3-hydroxy-2-carbamylnaphthalene,
4,4'-diaminobenzanilide→3-hydroxy-2-carbamylnaphthalene,
3,3'-diaminobenzanilide→3-hydroxy-2-carbamylnaphthalene,
3,4'-diaminobenzanilide→3-hydroxy-2-carbamylnaphthalene,
3',4-diaminobenzanilide→3-hydroxy-2-carbamylnaphthalene,
bis-(3-amino-4-methoxyphenyl)-sulfone→3-hydroxy-2-carbamylnaphthalene,
bis-(4-aminophenyl)-sulfone→3-hydroxy-2-N-(3-dimethylaminopropyl)-carbamylnaphthalene,
bis-(3-amino-4-methoxyphenyl)-sulfone→3-hydroxy-2-N-(3-dimethylaminopropyl)-carbamylnaphthalene and
2-methoxyaniline→N,N'-bis-(3-hydroxy-2-naphthoyl)-diaminoethane, (1.2)

3,3'-dimethoxy-4,4'-diaminodiphenyl→2-methoxyacetoacetanilide,
3,3'-dimethoxy-4,4'-diaminodiphenyl→2-chloroacetoacetanilide,
3,3'-dimethoxy-4,4'-diaminodiphenyl→4-methoxyacetoacetanilide,
4,4'-diaminobenzanilide→acetoacetanilide,
4,4'-diaminobenzanilide→2-methylacetoacetanilide,
4,4'-diaminobenzanilide→2-methoxyacetoacetanilide,
bis-(4-aminophenyl)-disulfide→2-methoxyacetoacetanilide,
3,3'-dimethoxy-4,4'-diaminodiphenyl→1-phenyl-3-methyl-pyrazol-5-one,
bis-(3-amino-4-methylphenyl)-sulfone→1-(4-methylphenyl)-3-methyl-pyrazol-5-one,
bis-(4-aminophenyl)-disulfide→1-phenyl-3-methyl-pyrazol-5-one,
bis-(4-aminophenyl)-sulfone→1-phenyl-3-methyl-pyrazol-5-one,
bis-(3-amino-4-methoxyphenyl)-sulfone→1-phenyl-3-methyl-pyrazol-5-one,
4,4'-diaminobenzanilide→1-phenyl-3-methyl-pyrazol-5-one,
3,3'-diaminobenzanilide→1-phenyl-3-methyl-pyrazol-5-one,
4,4'-diaminobenzanilide→1-(4-methylphenyl)-3-methyl-pyrazol-5-one,
4-aminoazobenzene→1-phenyl-3-methyl-pyrazol-5-one,
4-amino-2',3-dimethylazobenzene→1-phenyl-3-methyl-pyrazol-5-one, and
2,6-dichloro-4-nitroaniline→aminohydroquinonedimethyl ether→diethylamino-4-phenyl-1,3-thiazole.

(1.3)

Further suitable monoazo dyes from which the compounds of the formula I may be derived are azo dyes of the formula III

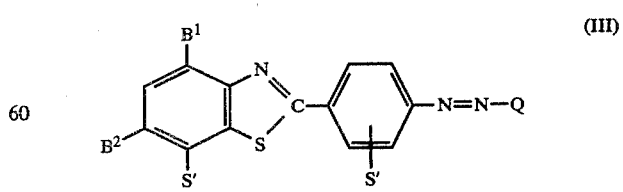

where $B^1$ is hydrogen or methyl, $B^2$ is hydrogen, methyl or ethoxy and $S'$ is —$SO_3H$ or hydrogen.

The radical Q is (1.3.1) a naphthol radical of the formula:

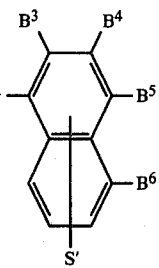 (IIIa)

where $B^3$ is hydrogen, hydroxyl, amino, 2-hydroxyethylamino, methylamino or phenylamino, $B^4$ is hydrogen, acetyl or N-phenylcarbamyl, $B^5$ is hydrogen, hydroxyl, methyl, methoxy, chlorine, bromine, 2-hydroxyethylamino or dimethylamino, $B^6$ is hydrogen, methyl or methoxy and $S'$ is hydrogen or $-SO_3H$, but either $B^3$ or $B^5$ must be hydroxyl, (1.3.2) a radical of the formula

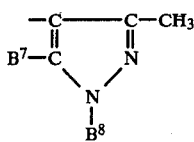 (IIIb)

where $B^7$ is hydroxyl or amino and $B^8$ is

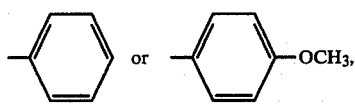

(1.3.3) a radical of the formula

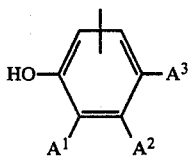 (IIIc)

where $A^1$ and $A^2$ independently of one another are hydrogen or methyl or one of the groups $A^1$ or $A^2$ is hydroxyl and $A^3$ is hydrogen, methyl, hydroxymethyl or chlorine, (1.3.4) a radical of the formula

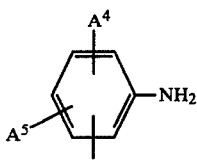 (IIId)

where $A^4$ is hydrogen, methyl or amino and $A^5$ is hydrogen, methyl, hydroxyl, methoxy or chlorine, (1.3.5) a radical of the formula

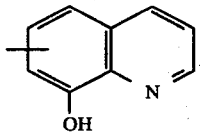 (IIIe)

(1.3.6) a radical of the formula

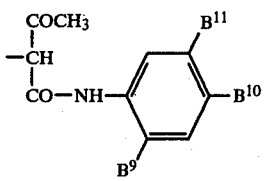 (IIIf)

where $B^9$ is hydrogen, methyl or methoxy, $B^{10}$ is hydrogen or chlorine and $B^{11}$ is hydrogen or methoxy, (1.3.7) a radical of the formula

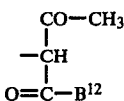 (IIIg)

where $B^{12}$ is $-OCH_3$, $-OC_4H_9$, $-NH_2$, $-NH-CH_3$,

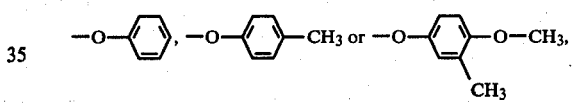

(1.3.8) a radical of the formula

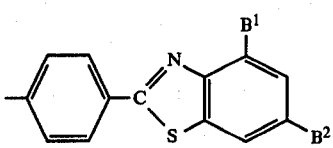 (IIIh)

where $B^1$ and $B^2$ have the above meanings, (1.3.9) a radical of the formula

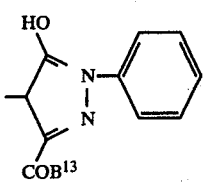 (IIIi)

where $B^{13}$ is $-NH_2$ or $-OCH_3$, or (1.3.10) a radical of the formula

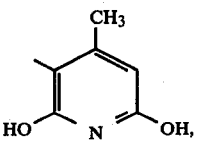 (IIIk)

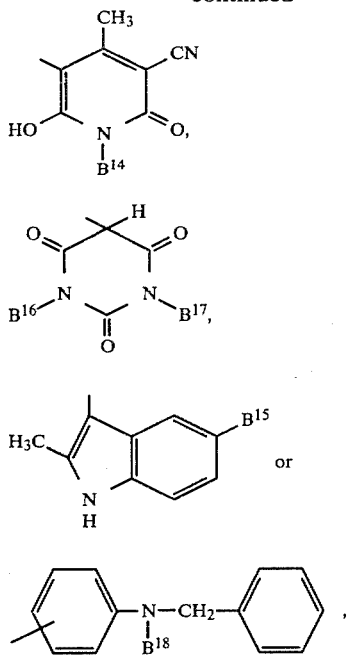

(IIIl)

(IIIm)

(IIIn)

(IIIo)

where $B^{14}$ is methyl or ethyl, $B^{15}$ is hydrogen, methyl, ethyl, methoxy, chlorine, bromine, cyano or trifluoromethyl, $B^{16}$ and $B^{17}$ independently of one another are hydrogen, $C_1$–$C_4$-alkyl, 3-methoxypropyl, 3-ethoxypropyl or phenyl and $B^{18}$ is hydrogen, methyl, ethyl or $C_1$–$C_4$-alkoxy-$C_2$–$C_3$-alkyl.

(1.4)

Further, the compounds II may be azo compounds of the general formula IV

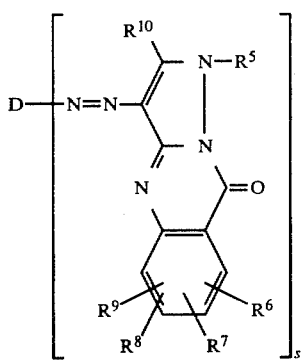

(IV)

where D is the radical of a conventional diazo or tetraazo compound, for example as described in German Laid-Open Application DOS No. 2,843,873, s is 1 or 2, $R^5$ is hydrogen or an aromatic radical, $R^6$ is hydrogen, chlorine, bromine, nitro, methyl, trifluoromethyl, carboalkoxy, unsubstituted or substituted carbamyl or sulfamyl, a sulfonic acid aryl ester group, cyano, alkanoylamino or phenyl, $R^7$ is hydrogen, chlorine or bromine, $R^8$ and $R^9$ independently of one another are hydrogen, chlorine or bromine or together are a fused ring and $R^{10}$ is hydroxyl, methyl, carboalkoxy, unsubstituted or substituted aryl or alkanoylamino, amongst which meanings methyl is preferred, or unsubstituted or chlorine- or methoxy-substituted phenyl.

(2) Examples of dyes II derived from quinophthalone are 2-[1,3-dioxo-hydrind-2-yl]-quinoline and 2-[1,3-dioxohydrind-2-yl]-5,6-benzoquinoline. The quinophthalones are obtained by condensing aromatic o- or peri-dicarboxylic acid anhydrides with compounds which possess a methyl group or activated methylene group, such as unsubstituted or substituted quinaldines. These dyes may, for example, carry halogen, alkyl, alkoxy, aryl, cyano, nitro, alkanoylamino, alkylmercapto and/or arylmercapto as substituents.

(3) An example of a bis-dioxazine compound F $(H)_{m+n}$ is C.I. Pigment Violet 23, C.I. No. 51,319.

(4) Amongst compounds of the 5,6-arylo-2-pyrone series, suitable compounds II are those which are substituted by a heterocyclic radical in the 3-position of the pyran ring. Compounds of this series suitable for the preparation of the dyes according to the invention are described, for example, in German Published Application DAS No. 1,098,125.

(5) Further suitable compounds F $(H)_{m+n}$ are condensates of naphtholactams with barbituric acid or its derivatives, as described in German Patent No. 2,428,198. Preferred naphtholactam dyes have the formula

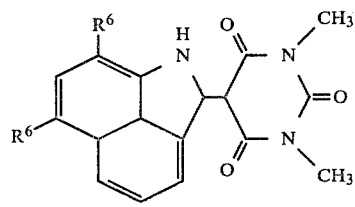

(V)

where $R^6$ is halogen, eg. chlorine or bromine, or is unsubstituted or substituted thiophenyl.

(6) Further suitable dyes of the formula II are triphenylmethane dyes, such as C.I. Basic Blue 26, C.I. No. 51,319, and xanthene dyes, eg. C.I. Solvent Violet 10, C.I. No. 45,190:1 and C.I. Solvent Dye 45, C.I. No. 45,195.

(7) Examples of suitable phthalocyanines F $(H)_{m+n}$ are copper, cobalt, nickel, zinc, aluminum and iron phthalocyanines and metal-free phthalocyanines. These phthalocyanines may contain up to 2 chlorine atoms in the molecule.

(8) Examples of indigoids F $(H)_{m+n}$ are indigo, dichloro-, tetrachloro- and dibromo-indigo, thioindigo and its dichloro and dibromo derivatives, mixed indigo-thioindigo derivatives and indigoid vat dyes containing more highly fused ring systems.

(9) Suitable anthraquinone dyes F $(H)_{m+n}$ are those which carry one or more of the following substituents: phenylamino, phenylalkylamino, phenoxy, thiophenyl, naphthylamino, phenyl or phenyltriazinyl. The dyes may contain up to 4 further substituents of a type conventional in anthraquinone dyes, for example amino, alkylamino, dialkylamino, alkoxyalkylamino, hydroxyl, alkoxy, alkyl, chlorine, bromine, nitro, sulfamyl, N-alkylsulfamyl, N,N-dialkylsulfamyl, carbamyl, N-alkylcarbamyl, N,N-dialkylcarbamyl, N-C-acylamino, carboxyl and —$SO_3H$.

The phenylamino, phenylalkylamino, naphthylamino and phenyltriazinyl groups are preferably in the α-position. Phenoxy and phenylthio may be in either the α- or the β-position, whilst phenyl is as a rule in the β-position.

(10) The group of more highly fused carbonyl-containing dyes includes (10.1) carbonyl-containing dyes based on anthraquinone and benzanthrone and (10.2) carbonyl-containing polycyclic dyes based on napthalene. Examples of (10.1) are dyes derived from violanthrone, isoviolanthrone, pyranthrone, benzanthronylaminoanthraquinone, acedianthrone, indanthrone and cis- and trans-dibenzopyrene-quinones.

Specific examples of (10.1) are violanthrone, isoviolanthrone, benzanthronyl-pyrazolanthrone, bis-benzanthrone-perithiophene, pyranthrone, its chlorine-containing and/or bromine-containing derivatives, indanthrone, chloroindanthrone containing 1 or 2 chlorine atoms in the molecule, cis- and trans-dibenzpyrene-quinones and their bromine derivatives, anthraquinone-monoacridones, anthraquinone-bisacridones and anthraquinone-thioxanthones.

Examples of napthalene-based carbonyl-containing dyes (10.2) are those derived from anthanthrone.

Preferred dyes of the formula I are those which are derived (a) from coupling products of aromatic carbocyclic diamines with β-naphthol, its derivatives and acetoacetanilides;

(b) from coupling products of aromatic carbocyclic diamines with pyrazol-5-one compounds, especially with 1-phenyl-3-methyl-pyrazol-5-one;

(c) from coupling products of unsubstituted or substituted aminoazobenzenes with pyrazol-5-one compounds, especially with 1-phenyl-3-methyl-pyrazol-5-one;

(d) from dyes of the formula III, where Q is one of the radicals of the formulae IIIa, IIIb, IIIf, IIIg, IIIh, IIIm or IIIo;

(e) from dyes of the formula IV, where D is phenyl which is unsubstituted or substituted by one or two substituents chosen from chlorine, nitro, methoxy, methyl, phenylazo or tolylazo, the substituents (where two are present) being identical or different except in the case of the nitro, phenylazo and tolylazo groups where they must be different;

(f) from quinophthalone, especially from 5,6-benzoquinophthalone;

(g) from 7-dialkylaminocoumarins which carry a benzimidazol-2-yl group in the 3-position, (h) from condensates of naphtholactams with barbituric acid or N-substituted barbituric acids and (i) from triphenylmethane or xanthene dyes.

Amongst the groups of dyes mentioned under (7) to (10), preferred dyes are those derived from (k) copper phthalocyanines and (l) from violanthrones, isoviolanthrones, naphthoylene-benzimidazoles and anthraquinone-bisacridones.

For tinctorial reasons, and because of their use characteristics, the novel dyes described in Examples 1, 3, 64, 71, 73, 76, 78, 79, 81, 82, 84, 85, 88, 91a, 91b and 92, and the dyes (I) derived from copper phthalocyanine, are particularly preferred.

The novel compounds of the formula I, where $m=0$, can be obtained by reacting a dye $F(H)_{m+n}$ (II) with anhydrous formaldehyde and an imidazole compound of the formula VI

in the presence of an acidic agent. In formula (VI), $R^1$ is hydrogen, $C_1$–$C_6$-alkyl or $C_2$–$C_6$-alkenyl and $R^2$ and $R^3$, independently of one another, are hydrogen, $C_1$–$C_5$-alkyl or $C_2$–$C_6$-alkenyl, the alkyl groups being linear or branched.

The formaldehyde used in the reaction may be the monomer or, preferably, a polymer thereof, such as paraformaldehyde or trioxane.

Specific examples of imidazoles VI are 1-methylimidazole, 1-ethylimidazole, 1-n-propylimidazole, 1-isopropylimidazole, 1-n-butylimidazole, 1-isobutylimidazole, 1-tert.-butylimidazole, 1-vinylimidazole, 1-allylimidazole, 4-methylimidazole, 2-methylimidazole, 1-butyl-2-methylimidazole, 1,2-dimethylimidazole, 1-ethyl-2-methylimidazole and 1-propyl-2-methylimidazole, amongst which 4-methylimidazole is particularly preferred.

The imidazoles VI are employed in not less than the stoichiometric amount and advantageously in excess, together with anhydrous formaldehyde.

The reaction to give compound I can also be carried out with C-hydroxymethylimidazoles, which have beforehand been prepared from VI and anhydrous formaldehyde, for example 4-hydroxymethyl-5-methylimidazole or 4-methyl-5-hydroxymethylimidazole. The imidazoles VI can also be employed in the form of their salts with mineral acids.

The reaction is in general carried out at from 0° to 140° C., preferably from 0° to 100° C. The reaction time depends on the number of methyleneimidazole groups to be introduced into II, on the dye II, on the acidic agent and on the reaction temperatures, but is in general from 1 to 48 hours.

Examples of suitable acidic agents, which can at the same time also serve as the reaction medium for the process, include 80–100% strength by weight sulfuric acid or phosphoric acid, with or without a dehydrating agent such as sulfur trioxide (oleum), phosphorus pentoxide, metaphosphoric acid, polyphosphoric acid, acetic anhydride, benzenesulfonic acid or toluenesulfonic acid. Preferred acidic agents which at the same time serve as the reaction medium are 96–100% strength by weight sulfuric acid, oleum of up to 12% strength by weight, or a mixture of 85% strength phosphoric acid and phosphorus pentoxide.

If desired, when carrying out the reaction in sulfuric acid or oleum, one or more sulfonic acid groups can be introduced into the products, during or after completion of the reaction with the imidazole compound, by increasing the sulfuric acid concentration and/or by raising the temperature. Dyes for coloring paper should as a rule not contain more than one sulfonic acid group, and preferably an average of 0–0.5 sulfonic acid group, per molecule.

The products I, where $m=0$, are precipitated by pouring the reaction mixture onto water or ice/water, and are filtered off. Where compound I is partially or completely soluble in the dilute aqueous acid, it is precipitated in the form of the free base by adding a basic agent, eg. sodium hydroxide solution, potassium hydroxide solution or ammonia, and is filtered off and either dried or used further in the form of the moist press cake.

An example of a further possible method of isolating the product from the dilute aqueous acid is to precipitate the product as a zinc chloride double salt by means of zinc chloride and sodium chloride.

Where the products contain sulfonic acid groups, they are as a rule in the form of the potassium, sodium or ammonium salts.

Dyes of the formula I which are derived from monoazo or disazo dyes can also be obtained by coupling the corresponding diazo compound with a coupling component containing one or more imidazolylmethylene groups. An example of a suitable coupling component is the amine of the formula (VII)

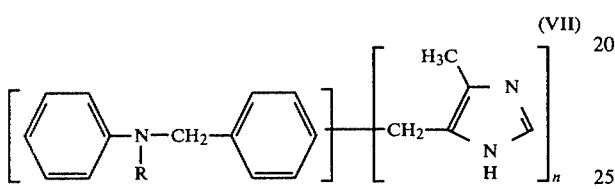
(VII)

where R is hydrogen, methyl, ethyl or $C_1$–$C_4$-alkoxy-$C_2$–$C_3$-alkyl and n is 1 or 2.

A diazo compound suitable for this coupling component is obtained by diazotizing, for example, 2-(4'-aminophenyl)-6-methylbenzthiazole.

The coupling components carrying imidazolylmethylene groups are prepared similarly to the dyes I by condensing the coupling component, which contains one or more aromatic rings, with an imidazole of the formula VI and paraformaldehyde under the conditions described earlier.

Compounds of the formula I which contain quaternary imidazolyl groups, ie. in which m is from 1 to 5, are obtained from the imidazolylmethylene-containing dyes I, where m=0, by alkylating in a conventional manner, for example by reaction with the corresponding chloro-$C_2$–$C_4$-alkanols or the corresponding sulfuric acid diesters, eg. dimethyl sulfate or diethyl sulfate, or the corresponding sulfonic acid esters, eg. $C_1$–$C_4$-alkyl toluenesulfonates, amongst which the methyl and ethyl esters, 2-chloroethanol and the chloropropanols are particularly preferred.

The technical advantage of the novel imidazolyl-containing dyes is that they may be obtained by simple, toxicologically safe processes which do not present any industrial hygiene problems. In contrast, the dyes of U.S. Pat. No. 3,565,570, German Published Application DAS No. 1,569,848 and German Laid-Open Application DOS No. 2,508,892, which are to be regarded as the closest prior art, are prepared from the corresponding chloromethyl compounds, in the preparation of which bis-chloromethyl ether is either used or formed as a by-product.

The Examples which follow illustrate the invention. Parts and percentages are by weight. The absorption maxima ($\lambda_{max}$) of the dyes were determined in solutions which, unless stated otherwise, contained 0.02 g of dye in 5% strength by weight acetic acid. The phthalocyanine radical is denoted by Pc.

EXAMPLE 1

21.5 parts of 4-methylimidazole and 7.5 parts of paraformaldehyde are introduced in parallel into 165 parts of 96% strength sulfuric acid, at 10°–15° C., and the mixture is stirred for 30 minutes at 40° C. When it has cooled to 0°–5° C., 26.9 parts of 4,4'-diaminobenzanilide→2 moles of β-naphthol are added a little at a time. The temperature is then allowed to rise slowly to 20° C. and the mixture is stirred for 30 hours at 20°–25° C. The reaction mixture is then poured out onto ice water, the acid is neutralized with dilute sodium hydroxide solution, and the precipitate is filtered off, washed salt-free with water and dried.

Yield: 42 parts of the disazo dye of the formula

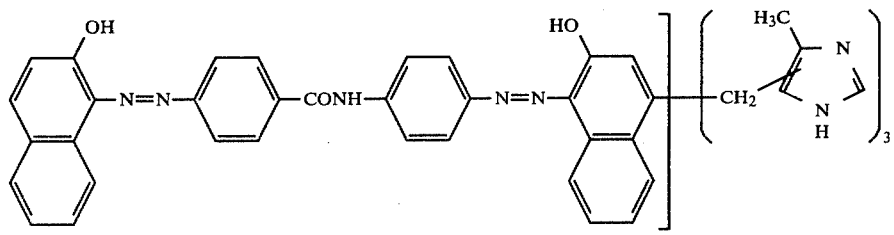

in the form of a red powder. Color of a solution in dilute acetic acid: red; $\lambda_{max}$ 505 nm.

Analysis: $C_{48}H_{41}N_{11}O_3$ (molecular weight 819): calculated N 18.8%; found N 19.0%.

If the product is used for the wet-end coloring of paper, a colorless waste water is obtained. If Use Example 3 is followed, a very brilliant red paper with very good colorfastness to water is obtained.

EXAMPLE 2

The procedure described in Example 1 is followed, but 28.7 parts of 4,4'-diamino-benzenesulfanilide→β-naphthol are used as (II).

42 parts of the disazo dye of the formula

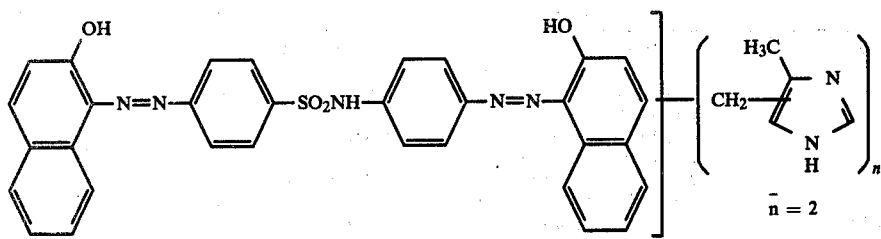

are obtained.

The dye powder is reddish violet and the color of a solution in dilute acetic acid is also reddish violet. $\lambda_{max}$ 483 nm.

EXAMPLE 3

20.5 parts of 4-methylimidazole and 7.5 parts of paraformaldehyde are introduced in parallel into 165 parts of 96% strength sulfuric acid at 0°–5° C. and the mixture is stirred for half an hour at 40° C. When it has cooled to 0°–5° C., 31.5 parts of the dye 4,4′-diamino-3,3′-dichlorodiphenyl→acetoacetanilide are introduced and the batch is stirred for 15 hours at 20°–25° C.

The reaction mixture is then poured out onto ice water and neutralized with dilute sodium hydroxide solution, and the precipitate is filtered off, washed salt-free and dried at 50° C.

Yield: 47 parts of the disazo dye of the formula:

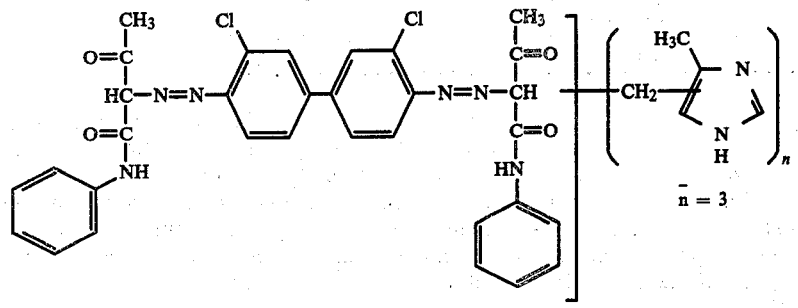

A solution in dilute acetic acid is yellow.

Analysis: $C_{47}H_{44}Cl_2N_{12}O_4$ (n=3) (molecular weight 911): calculated N 18.4%; found N 18.6%.

When used for wet-end coloring of paper, the dye gives a yellow product. The waste water is colorless. The absorption maximum is at 398 nm.

EXAMPLE 4

The procedure described in Example 3 is followed, but 4,4′-diamino-3,3′-dichlorodiphenyl→2-methoxyacetoacetanilide is used as the dye. Yield: 50 parts of a dye containing 3 imidazolylmethylene groups.

Analysis: $C_{49}H_{48}Cl_2N_{12}O_6$ (n=3) (molecular weight 971): calculated N 17.3%; found N 17.9%.

The dye gives a yellow solution in dilute acetic acid. If the dye is used for wet-end coloring of paper, colorless waste water is obtained. The absorption maximum is at 422 nm.

EXAMPLES 5 TO 37

If the procedure described in Examples 1 to 3 is used, but the dyes characterized in the Table which follows by statement of the amines and of the coupling components are used, the corresponding dyes containing 4-methylimidazolylmethylene groups are obtained. The dyes contain 1, 2 or 3 imidazolylmethylene groups. Mixtures of dyes containing 1, 2 and 3 of these groups may also be obtained.

The dyes obtained dissolve in dilute acetic acid, propionic acid, lactic acid and methoxyacetic acid, to give the stated hues. On paper, colorations in the same hues are obtained.

| Example | Amine | Coupling component | Hue |
|---|---|---|---|
| 5 | 4,4′-diamino-diphenylurea | p-cresol | yellow |
| 6 | 3,3′-dimethoxy-4,4′-diaminodiphenyl | β-naphthol | reddish violet |
| 7 | bis-(4-aminophenyl)-disulfide | β-naphthol | orange |
| 8 | bis-(3-amino-4-methoxyphenyl)-sulfone | β-naphthol | reddish orange |
| 9 | bis-(3-amino-4-methylphenyl)-sulfone | β-naphthol | yellowish orange |
| 10 | bis-(4-aminophenyl)-sulfone | 3-hydroxy-2-naphth-o-anilide | reddish orange |
| 11 | bis-(4-aminophenyl)-sulfone | 3-hydroxy-2-naphth-o-anisidide | yellowish red |
| 12 | bis-(3-amino-4-methoxyphenyl)-sulfone | 3-hydroxy-2-naphth-o-anisidide | red |
| 13 | 3,4′-diaminobenzanilide | 3-hydroxy-2-naphth-o-anisidide | bluish red |
| 14 | 3′,4-diaminobenzanilide | 3-hydroxy-2-naphth-o-anisidide | yellowish red |
| 15 | 3,3′-dimethoxy-4,4′-diamino-biphenyl | 3-hydroxy-2-naphth-o-anisidide | reddish violet |
| 16 | bis-(4-aminophenyl)-disulfide | 3-hydroxy-2-naphth-o-phenetidide | bluish red |
| 17 | bis-(3-amino-4-methoxyphenyl)-sulfone | 3-hydroxy-2-naphth-o-toluidide | red |

-continued

| Example | Amine | Coupling component | Hue |
|---|---|---|---|
| 18 | bis-(3-amino-4-methylphenyl)-sulfone | 3-hydroxy-2-naphth-o-toluidide | reddish orange |
| 19 | bis-(4-aminophenyl)-disulfide | 3-hydroxy-2-naphth-o-toluidide | bluish red |
| 20 | 4,4'-diaminobenzanilide | 3-hydroxy-2-carbamyl-naphthalene | bluish red |
| 21 | 3,3'-diaminobenzanilide | 3-hydroxy-2-carbamyl-naphthalene | yellowish red |
| 22 | 3,4'-diaminobenzanilide | 3-hydroxy-2-carbamyl-naphthalene | bluish red |
| 23 | 3',4-diaminobenzanilide | 3-hydroxy-2-carbamyl-naphthalene | yellowish red |
| 24 | bis-(3-amino-4-methoxyphenyl)-sulfone | 3-hydroxy-2-carbamyl-naphthalene | yellowish red |
| 25 | bis-(4-aminophenyl)-sulfone | 3-hydroxy-2-N—(3-dimethyl-aminopropyl)-carbamyl-naphthalene | yellowish red |
| 26 | bis-(3-amino-4-methoxyphenyl)-sulfone | 3-hydroxy-2-N—(3-dimethyl-aminopropyl)-carbamyl-naphthalene | red |
| 27 | 4,4'-diaminobenzanilide | acetoacetanilide | yellow |
| 28 | 4,4'-diaminobenzanilide | 2-methylacetoacetanilide | yellow |
| 29 | 4,4'-diaminobenzanilide | 2-methoxyacetoacetanilide | yellow |
| 30 | bis-(4-aminophenyl)-disulfide | 2-methoxyacetoacetanilide | reddish yellow |
| 31 | bis-(4-aminophenyl)-disulfide | 1-phenyl-3-methyl-pyrazol-5-one | reddish yellow |
| 32 | bis-(4-aminophenyl)-sulfone | 1-phenyl-3-methyl-pyrazol-5-one | reddish yellow |
| 33 | bis-(3-amino-4-methoxyphenyl)-sulfone | 1-phenyl-3-methyl-pyrazol-5-one | reddish yellow |
| 34 | 4,4'-diaminobenzanilide | 1-phenyl-3-methyl-pyrazol-5-one | reddish yellow |
| 35 | 3,3'-diaminobenzanilide | 1-phenyl-3-methyl-pyrazol-5-one | reddish yellow |
| 36 | 4,4'-diaminobenzanilide | 1-(4-methylphenyl)-3-methyl-pyrazol-5-one | reddish yellow |
| 37 | aniline → 1-naphthylamine | 2,3-dihydro-2,2-dimethyl-permidine | blackish brown |

EXAMPLE 38

21.5 parts of 4-methylimidazole and 7.5 parts of paraformaldehyde are introduced simultaneously into 270 parts of 96% strength sulfuric acid at 10°-15° C. and the mixture is stirred for 2 hours at 50° C. 21.5 parts of the monoazo compound 2-(3'-phenyl-1',2',4'-oxadiazolyl)-4-chloro-aniline→2,6-dihydroxy-3-methyl-4-cyanopyridine are introduced, a little at a time, at 20° C. (The monoazo compound was prepared by the process described in German Pat. No. 2,457,687, Example 64). The mixture is stirred for 4 hours at 50° C. and 16 hours at 20°-25° C. and is then poured out onto ice water. The solution is neutralized with dilute sodium hydroxide solution and the precipitate is filtered off, washed salt-free and dried.

Yield: 29 parts of a dye containing one imidazolylmethylene group. Absorption maximum 400 nm.

A similar reaction of the other monoazo compounds mentioned in German Pat. No. 2,457,687 also gives yellow to red imidazolylmethylated products, which are mixtures of dyes containing either one or two imidazolylmethylene groups in the molecule. The dyes are soluble in dilute acetic acid, lactic acid or methanesulfonic acid.

EXAMPLES 39 TO 55

The procedure described in Example 38 is followed, but the monoazo compounds characterized, in the Table which follows, by the monoamine and the coupling component are used. Dyes containing a 4-methylimidazolylmethylene group are obtained. The dyes dissolve in dilute acetic acid, propionic acid, lactic acid and methoxyacetic acid, giving the stated hues. Wet-end coloring of paper gives the same hues, with a colorless or only slightly colored waste water.

| Example | Monoamine | Coupling component | Hue |
|---|---|---|---|
| 39 | 4-methoxyaniline | β-naphthol | pale brown |
| 40 | 2-methoxyaniline | 3-hydroxy-4'-chloro-2-naphthanilide | bluish red |
| 41 | 2-chloroaniline | 3-hydroxy-4'-chloro-2-naphthanilide | yellowish red |
| 42 | aniline | 3-hydroxy-2-naphthanilide | yellowish red |
| 43 | 2-chloroaniline | 3-hydroxy-2-naphth-o-anisidide | yellowish red |
| 44 | 4-chloroaniline | 3-hydroxy-2-naphth-o-anisidide | yellowish red |
| 45 | 5-N—phenylsulfamyl-2-methoxyaniline | 3-hydroxy-2-naphth-o-anisidide | red |
| 46 | aniline | 3-hydroxy-2-naphth-o-anisidide | yellowish red |
| 47 | 2-methoxyaniline | 3-hydroxy-2-naphth-o-anisidide | bluish red |
| 48 | aniline | 3-hydroxy-5'-chloro-2-naphth-o-anisidide | yellowish red |
| 49 | o-toluidine | 3-hydroxy-5'-chloro-2-naphth-o-anisidide | yellowish red |
| 50 | 2-methoxyaniline | 3-hydroxy-2-naphth-o-toluidide | bluish red |

-continued

| Example | Monoamine | Coupling component | Hue |
|---|---|---|---|
| 51 | 2-chloroaniline | 3-hydroxy-2-naphth-o-toluidide | yellowish red |
| 52 | aniline | 3-hydroxy-2-naphth-o-phenetidide | yellowish red |
| 53 | o-toluidine | 3-hydroxy-2-naphth-o-phenetidide | bluish red |
| 54 | 2-methoxyaniline | 3-hydroxy-2-naphth-o-phenetidide | bluish red |
| 55 | 2-methoxyaniline | 3-hydroxy-2-carbamyl-naphthalene | bluish red |

EXAMPLE 56

23 parts of Solvent Black 3, C.I. 26,150, are introduced, a little at a time, into 276 parts of 96% strength sufuric acid at 10°–20° C., and 18 parts of 4-methyl-5-hydroxymethyl-imidazole hydrochloride are then added at 20° C. The reaction mixture is stirred for 5 hours at 40° C. and then poured out onto 1,000 parts of ice water, insoluble matter is filtered off and the filtrate is neutralized with sodium hydroxide solution. The precipitate is filtered off, washed salt-free and dried.

Yield: 17 parts of a partially sulfonated imidazolylmethylated azo dye in which $\bar{n}=1$.

EXAMPLE 57

20 parts of 2-(4′-aminophenyl)-6-methylbenzthiazole→β-naphthol and 16.4 parts of 4-methylimidazole are dissolved in 250 parts of sulfuric acid monohydrate at 20° C., after which 8.3 parts of paraformaldehyde are introduced, a little at a time, in the course of 3 hours, at 20°–25° C. The mixture is stirred for 16 hours at the same temperature and is then precipitated by pouring into 2,000 parts of ice water and brought to pH 10 with 400 parts of 50% strength sodium hydroxide solution. The precipitate is filtered off, washed neutral and salt-free with water and dried at 80° C.

Yield: 31.2 parts of an imidazolylmethylated azo dye of the formula

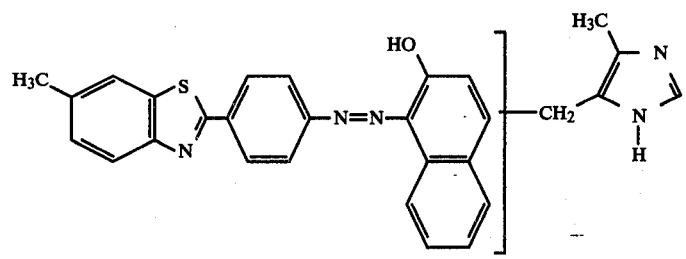

in the form of a red powder.

Analysis: $C_{29}H_{23}N_5OS$ (489): calculated: N 14.3 S 6.5%; found: N 15.5, S 6.2%

Color of a solution in 30% strength acetic acid: red; $\lambda_{max}$ 499 nm.

EXAMPLES 58 TO 63

Following a method similar to Example 57, the monoazo compounds characterized, in the Table which follows, by the amine and the coupling component are reacted with 4-methylimidazole under the conditions stated in column 7. The dyes obtained are isolated as in Example 57. The number of 4-methylimidazolylmethylene groups is shown in column 4.

The color of a solution in dilute acetic acid is shown in column 5. Wet-end coloring of paper gives the same hue. The waste water is colorless or virtually colorless.

| Example | Amine | Coupling component | n | Hue | $\lambda_{max}$ [nm] | Reaction time [h] | Reaction temperature [°C.] |
|---|---|---|---|---|---|---|---|
| 58 | H₃C–[benzothiazole]–⟨⟩–NH₂ | O=C–CH₃, CH₂, O=C–NH–⟨OCH₃⟩ | 1 | yellow | 393 | 2 | 50 |
| 59 | " | HO–[naphthalene] | n ≈ 1 | red | 499 | 16 | 20–25 |

-continued

| Example | Amine | Coupling component | n | Hue | $\lambda_{max}$ [nm] | Reaction time [h] | temperature [°C.] |
|---|---|---|---|---|---|---|---|
| 60 | " | 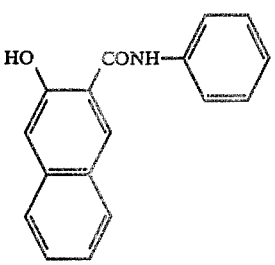 | n ≈ 1 | bluish red | | (a) 7<br>(b) 4 | 40<br>60 |
| 61 | " | 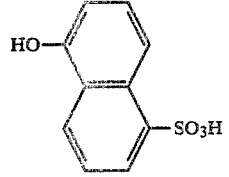 | n ≈ 2 | bluish red | | (a) 17<br>(b) 8<br>(c) 8 | 20–25<br>40<br>60 |
| 62 | " | 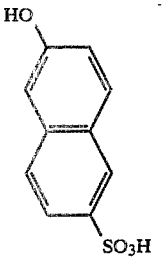 | n ≈ 2 | orange | | (a) 10<br>(b) 5 | 60<br>100 |
| 63 | " | 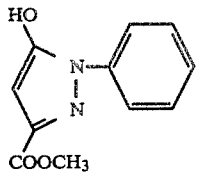 | n ≈ 1 | yellow | | (a) 19<br>(b) 5 | 20–25<br>40 |

EXAMPLE 64

17 parts of 4-methylimidazole and 6 parts of paraformaldehyde are introduced simultaneously, with cooling, into 270 parts of 96% strength sulfuric acid at 10°–15° C., and the mixture is then stirred at 40° C. After 2 hours, 19.6 parts of 2-(4'-aminophenyl)-6-methylbenzimidazole→barbituric acid are sprinkled, a little at a time, into the mixture. After 9 hours at 40° C., the solution is poured out onto ice water and the precipitate is filtered off, washed neutral with small portions of ice water and dried under reduced pressure at 50° C.

Yield: 24 parts of azo dye of the formula

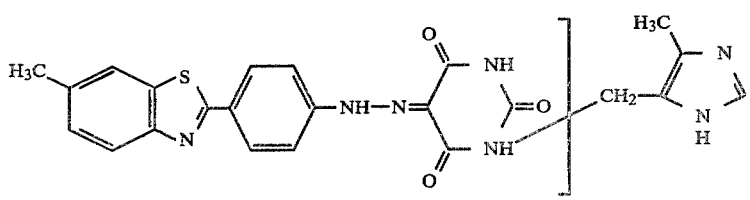

Analysis: $C_{13}H_{19}N_7O_3S$ (473): calculated N 20.6, S 6.7; found N 20.6, S 6.3.

A solution of the dye in acetic acid, when used for the wet-end coloring of paper, gives a brilliant yellow, very lightfast hue. $\lambda_{max}$ 412 nm (0.01 g/l of 5% strength acetic acid). If the dye is used for wet-end coloring of paper by the method of Use Example 3, a reddish yellow paper which has good lightfastness and fastness to bleeding is obtained.

EXAMPLE 65

12.5 parts of 3-chloro-4-amino-azobenzene→2-phenyl-pyrazolo[5,1-b]quinazolone and 8.2 parts of 4-methylimidazole are introduced into 125 parts of sulfuric acid monohydrate at 20°–25° C., and 4.2 parts of paraformaldehyde are then added, a little at a time. The mixture is stirred for 16 hours at 20°–25° C. and is then poured out onto 1,000 parts of ice water and brought to pH 10 with 50% strength sodium hydroxide solution (about 220 parts). The precipitate is filtered off, washed neutral and dried at 80° C.

Yield: 15.9 parts of a mixture which consists of mono-imidazolylmethylated diazo dye of the formula are isolated. The number of imidazolylmethylene groups is shown in column 4. The hue of a solution in 30% strength acetic acid is shown in column 5, and the absorption maximum in column 6.

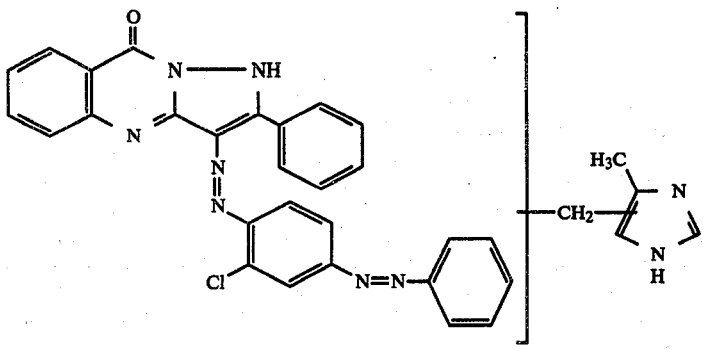

| Example | Amine | Coupling component | n | Hue of a solution in 10% strength acetic acid | $\lambda_{max}$ [nm] |
|---|---|---|---|---|---|
| 66 | ![phenyl-N=N-phenyl(Cl)-NH2] | ![coupling component with CH3] | 1 | orange red | 462 |
| 67 | ![Cl-phenyl(NO2)-NH2] | " | 1 | orange | 473 |
| 68 | ![O2N-phenyl(OCH3)-NH2] | " | 1 | orange | 462 |
| 69 | ![H3CO-phenyl(NO2)-NH2] | " | 1 | orange | 396 |
| 70 | ![O2N-phenyl(OCH3)-NH2] | ![Cl-substituted coupling component] | 1 | orange | 389[1] |

[1] measured in an 0.04 g/l solution in 5% strength acetic acid

Analysis: $C_{33}H_{24}ClN_9O$ (597.5): calculated: Cl 5.94, N 21.08; found: Cl 5.4, N 20.7.

A solution in 5% strength acetic acid is red. $\lambda_{max}$ 471 nm.

EXAMPLES 66 TO 70

Using the methods described in Examples 38 or 56, the monoazo compounds characterized, in the Table which follows, by the amine and the coupling component are reacted with 4-methylimidazole, and the dyes

EXAMPLE 71

20.5 parts of 4-methylimidazole and 7.5 parts of paraformaldehyde are introduced, in parallel, into 270 parts of 96% strength sulfuric acid at 20° C. The temperature is then raised to 50° C. and maintained thereat for 2 hours. Thereafter, 16.1 parts of 2-[1,3-dioxohydrind-2-yl]-5,6-benzoquinoline are introduced, a little at a time, at 45°–50° C., after which the mixture is stirred for one hour at 50° C. The reaction solution is poured out onto ice water and neutralized with 50% strength sodium hydroxide solution. The yellow precipitate is filtered off and washed salt-free.

Yield: 33 parts of imidazolylmethylated 2-[1,3-diox-ohydrid-2-yl]-5,6-benzoquinoline, where n=1.

Analysis: $C_{27}H_{20}N_3O_2$ (417) calculated: N 10.07; found: N 10.3.

$\lambda_{max}$ 418 nm.

If the yellow dye powder is dissolved in dilute acetic acid and used for wet-end coloring of paper by the methods described in Use Example 1, 2 or 3, deep yellow papers are obtained. The waste water is colorless.

EXAMPLE 72

The procedure described in Example 71 is followed, but using 1-methylimidazole instead of 4-methylimidazole. The mixture is kept for 5 hours at 40° C. and 12 hours at 60° C., and is then worked up as in Example 71.

Yield: 18 parts of the dye of the formula

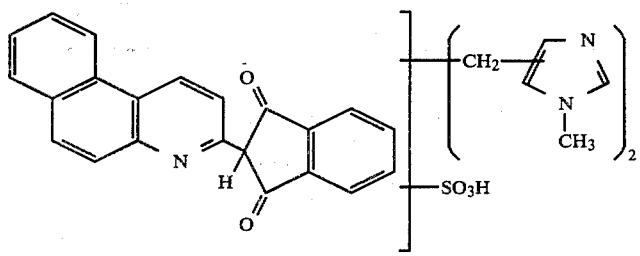

Color of a solution in dilute acetic acid: yellow; $\lambda_{max}$ 418 nm.

EXAMPLE 73

65 parts of 2-[1,3-dioxo-hydrind-2-yl]-5,6-benzoquinoline are introduced into 100 parts of 96% strength sulfuric acid at 15°-20° C., and dissolved therein. 72 parts of 82.6% strength 4-methyl-5-hydroxymethylimidazole are added, a little at a time. The mixture is stirred for 2 hours at 20°-25° C. and 3 hours at 50° C. and is then poured out onto ice and water and neutralized with 50% strength sodium hydroxide solution at 10°-15° C.; the product is filtered off, washed salt-free and dried.

Yield: 99 parts of a mixture of imidazolyl-methylated 2-[1,3-dioxohydrind-2-yl]-5,6-benzoquinoline with n=1 and with n=2; $\bar{n}$=1.3; $\lambda_{max}$ 408 nm.

On paper, the tinctorial properties of the yellow dye correspond to those of the dye of Example 71. The waste water is colorless.

If the dye is employed in the method of Use Example 3, a very brilliant deep yellow paper is obtained, which has good fastness to bleeding.

EXAMPLE 74

20.5 parts of 4-methylimidazole and 7.5 parts of paraformaldehyde in 275 parts of 96% strength sulfuric acid are stirred for 2 hours at 50° C. and the mixture is then cooled to 20°-25° C. 28.7 parts of 2-[1,3-dioxo-4,7-dichloro-5,6-dithiophenyl-hydrind-2-yl]quinoline are then introduced and the batch is stirred for 2 hours at 50° C. and 16 hours at 20°-25° C. The acid solution obtained is poured out onto ice water and neutralized with 50% strength sodium hydroxide solution, whilst cooling. The precipitate is filtered off, washed salt-free with water and dried under reduced pressure at 50° C.

Yield: 46 parts of a yellow powder. The dye contains 2 imidazolylmethylene groups per molecule.

If the dye is used for the wet-end coloring of paper, a colorless waste water is obtained.

EXAMPLE 75

25.5 parts of 4-methylimidazole and 9 parts of paraformaldehyde are introduced simultaneously into 1,200 parts of 96% strength sulfuric acid at 10°-15° C., with cooling; the mixture is then stirred for one hour at 30°-35° C., after which 59 parts of C.I. Pigment Violet 32 (C.I. No. 51,319) are added, a little at a time. The mixture is stirred for 5 hours at 30°-35° C. and is poured out onto ice water, and the resulting solution is neutralized with 50% strength sodium hydroxide solution. The violet precipitate is washed salt-free with water and dried at 80° C.

Yield: 96 parts of a dye which is a mixture of the products with n=1 and n=2.

The dye dissolves in dilute acetic acid or lactic acid, to give a violet hue; $\lambda_{max}$ 570 nm. Paper stock colored with this solution by the method of Use Example 1 has a deep bluish violet hue. The waste water is colorless. The colored material has very good fastness to bleeding.

EXAMPLE 76

20.5 parts of 4-methyl-imidazole are introduced into 270 parts of 96% strength sulfuric acid at 20°-25° C., after which 7.5 parts of paraformaldehyde are added, a little at a time. The mixture is stirred for 2 hours at 50° C. and is then cooled, and 16.7 parts of 3-(benzimidazol-2'-yl)-7-diethylaminocoumarin (prepared as described in Example 2 of German Published Application DAS No. 1,098,125) are introduced at 15°-20° C., after which the batch is stirred for 8 hours at the same temperature. It is then poured out onto ice water and neutralized with dilute sodium hydroxide solution at 0°-30° C. The precipitate is filtered off, washed salt-free and dried.

Yield: 25 parts of imidazolylmethylated 3-(benzimidazol-2'-yl)-7-diethylamino-coumarin; n=1.

Analysis: $C_{25}H_{24}N_5O_2$ (440): calculated N 15.9%; found N 15.6%.

$\lambda_{max}$ 475 nm.

In thin layer chromatography on silica gel plates having an 0.25 mm coating, using a solvent mixture of 5 parts of chloroform, 2 parts of glacial acetic acid and 1 part of methanol, the starting material has an Rf of 0.99 and the imidazolylmethylated product an Rf of 0.1. The dye obtained no longer contains any starting material.

When the dye is employed for the wet-end coloring of paper by the method of Use Example 2, a yellow paper having good fastness to bleeding is obtained.

EXAMPLE 77

21.5 parts of 4-methylimidazole and 7.5 parts of paraformaldehyde are introduced simultaneously into 270 parts of 96% strength sulfuric acid at 10°–15° C. and the mixture is stirred for an hour at 35°–40° C. 20.6 parts of the monoazo compound 2,5-dichloroaniline→N-phenyl-ethyl-2-hydroxy-3-cyano-4-methylpyrid-6-one are then introduced at 20° C. and the mixture is stirred for 18 hours at 20°–25° C. Thereafter it is poured out onto ice water and neutralized with dilute sodium hydroxide solution. The precipitate is filtered off, washed with a small amount of water, and dried.

Yield: 48 parts of dye, containing some salt. The dye dissolves in dilute acetic acid, giving a yellow hue; $\lambda_{max}$ 423 nm.

Wet-end coloring of paper with the imidazolylmethylated product gives a clear yellow hue.

Analysis: $C_{22}H_{19}N_5O_3$ (401): calculated: N 17.6%; found: N 17.4%.

The dye gives a yellow solution in dilute acetic acid.

EXAMPLE 79

17.1 parts of 4-methylimidazole and 6 parts of paraformaldehyde are introduced into 270 parts of 96% strength sulfuric acid at 10°–15° C. and the mixture is stirred for 2 hours at 40° C. 20.8 parts of the condensate of 4-phenylmercaptonaphtho-1,8-lactam and N,N'-dimethylbarbituric acid, prepared as described in Example 7 of German Laid-Open Application DOS No. 2,428,198, are added, a little at a time, and the mixture is stirred at 40° C. until reaction is complete. The solution is poured out onto ice water and neutralized with 25% strength ammonia, whilst cooling, and the precipitate is filtered off, washed thoroughly and dried at 50° C.

Yield: 35 parts of the dye of the formula

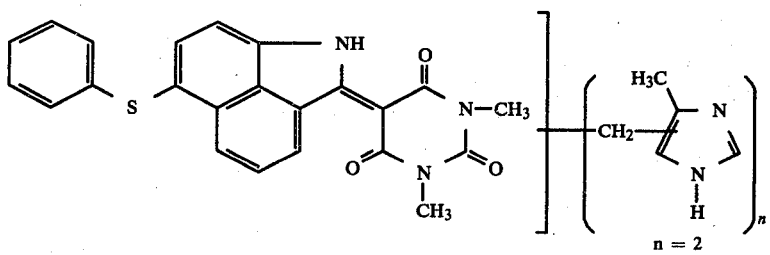

EXAMPLE 78

12.8 parts of 4-methylimidazole and 4.5 parts of paraformaldehyde are introduced, in parallel, into 270 parts of 96% strength sulfuric acid at 10°–15° C., with cooling, and the mixture is stirred for 2 hours at 40° C. 15.4 parts of the condensate of naphtholactam and N,N'-dimethylbarbituric acid, prepared as described in Example 1 of German Laid-Open Application DOS No. 2,428,198, are then introduced, a little at a time, and the solution is kept at 40° C. for 3 hours. Thereafter it is poured out into ice water and neutralized with ammonia, and the precipitate is filtered off, thoroughly washed and dried.

Yield: 23 parts of the dye of the formula

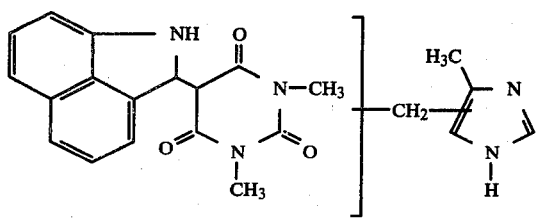

Analysis: $C_{33}H_{26}N_7O_3S$ (603): calculated: N 16.35 S 5.3%; found: N 15.3 S 5.4%.

$\lambda_{max}$ 475 nm.

A solution of the dye in acetic acid, when employed for wet-end coloring of paper by the method of Use Example 1, gives a red paper having good wetfastness.

EXAMPLE 80

12.8 parts of 4-methylimidazole and 4.5 parts of paraformaldehyde are introduced into 270 parts of 96% strength sulfuric acid at 10°–15° C. and the mixture is stirred for 2 hours at 40° C. 26.2 parts of a condensate of 1,4-diphenyl-mercaptonaphtho-1,8-lactam and N,N'-dimethylbarbituric acid (prepared as described in German Laid-Open Application DOS No. 2,428,198) are added, a little at a time, at 40° C., and the solution is stirred for 1 hour at the same temperature. It is then poured out onto ice and worked up as in Example 1.

Yield: 48 parts of the dye of the formula

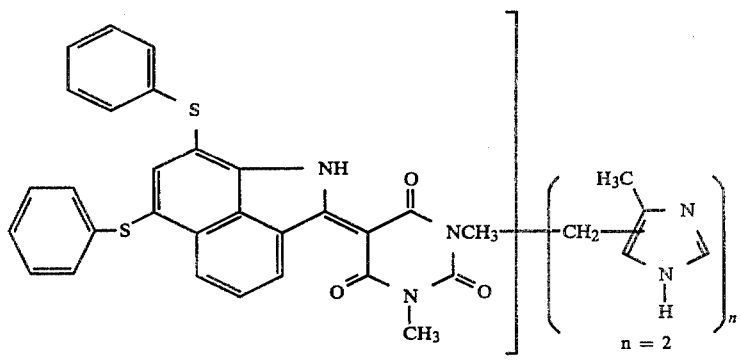

Analysis: $C_{39}H_{34}N_7O_3S_2$ (711) (n=2) calculated: N 13.78%; found: N 13.8%.

$\lambda_{max}$ 506 nm (in an 0.03 g/l solution in 5% strength acetic acid).

A solution of the dye in acetic acid, when employed for wet-end coloring of paper by the method of Use Example 1, gives a red paper having good wetfastness. The waste water is colorless.

EXAMPLE 81

20.5 parts of the dye 4-amino-3,2'-dimethylazobenzene→1-phenyl-3-methyl-pyrazol-5-one and 16.4 parts of 4-methylimidazole are introduced into 250 parts of sulfuric acid monohydrate at 10°–15° C. 8.3 parts of paraformaldehyde are then sprinkled into the mixture, a little at a time, over 30 minutes, and the batch is stirred for 20 hours at 20°–25° C., precipitated by pouring onto 2,000 parts of ice water and brought to pH 9–10 with 50% strength sodium hydroxide solution; the product is filtered off and washed with water.

Yield: 25 parts of the mono-imidazolylmethylated disazo dye of the formula

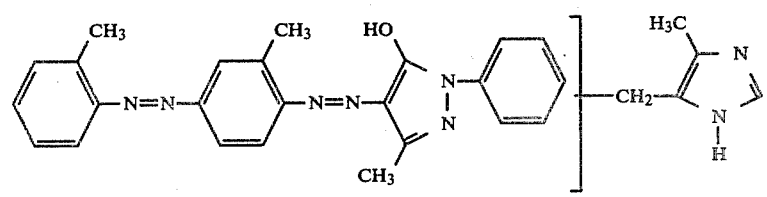

Analysis: $C_{28}H_{26}N_8O$ (490): calculated N 22.8% found: N 22.6%.

Employing the methods of Use Examples 1 to 3, an acetic acid solution of this dye gives brilliant deep yellowish orange colorations on paper, the waste water being only very slightly colored.

If the dye is employed for wet-end coloring as described in Use Example 1, brilliant deep yellowish orange paper having good fastness to bleeding is obtained.

EXAMPLE 82

The procedure described in Example 81 is employed, but using, as the dye, 19.1 parts of 4-aminoazobenzene→1-phenyl-3-methyl-pyrazol-5-one.

Yield: 26.8 parts of the dye of the formula

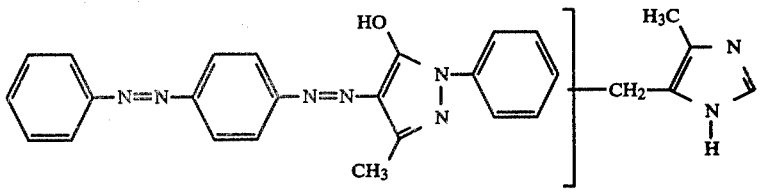

Analysis: $C_{27}H_{23}N_8O$ (475): calculated: N 23.5%; found: N 22.5%.

The tinctorial properties correspond to those of the dye of Example 81.

Wet-end coloring of paper by the method of Use Example 2 gives a deep yellowish orange paper having good fastness to bleeding.

EXAMPLE 83

13.8 parts 1-butyl-2-methyl-imidazole and 4.5 parts of paraformaldehyde are introduced simultaneously into 130 parts of 96% strength sulfuric acid at 5°–10° C., and the mixture is stirred for one hour at 20° C. 10 parts of the dye 4-amino-azobenzene→1-phenyl-3-methyl-pyrazol-5-one are then introduced, a little at a time. The reaction mixture is stirred for 15 hours at 20°–25° C. and 6 hours at 40° C. and is then poured out onto ice water and brought to pH 10 with 50% strength sodium hydroxide solution. The precipitate is filtered off, washed neutral and dried at 80° C. Yield: 14.9 parts of the dye of the formula

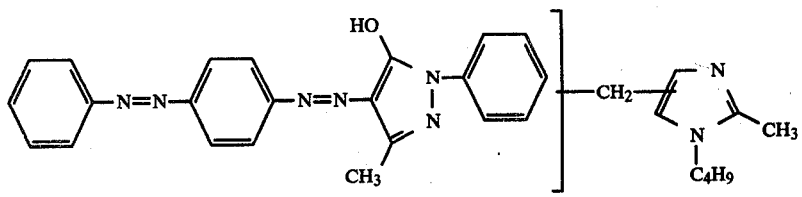

Color of a solution in 5% strength acetic acid: yellow. $\lambda_{max}$ 417 (measured in an 0.01 g/l solution in 5% strength acetic acid).

EXAMPLE 84

9.7 parts of 1,2-dimethylimidazole and 4.2 parts of paraformaldehyde are introduced simultaneously into 130 parts of 96% strength sulfuric acid at 5°–10° C. and the mixture is stirred for 30 minutes. 12.5 parts of the dye 3-chloro-4-aminoazobenzene→2-phenyl-pyrazolo[5,1-b]quinazolone are then introduced, a little at a time. The reaction mixture is stirred for 6 hours at 40°–45° C. and 5 hours at 60° C. and is then poured onto 1,000 parts of ice water, and the solution obtained is brought to pH 7.5 with 25% strength aqueous ammonia. The precipitate is filtered off, washed salt-free and dried at 80° C.

Yield: 17.5 parts of the disazo dye of the formula

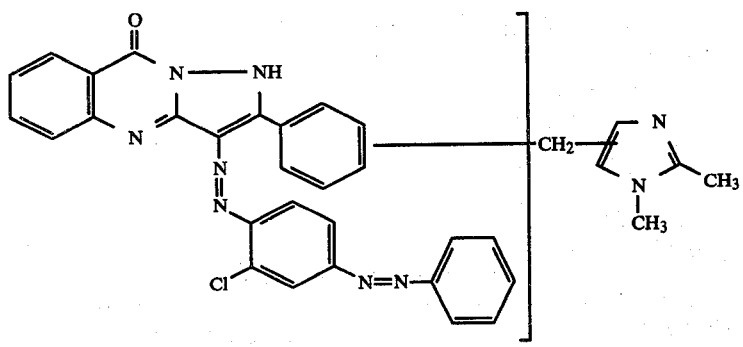

Analysis: $C_{34}H_{26}ClN_9O$ (molecular weight 611.5): calculated N 23.5, Cl 5.8%; found N 20.6, Cl 5.3%.

A solution in 5% strength acetic acid is orange red; $\lambda_{max}$ 461 nm.

EXAMPLE 85

10.9 parts of 2-ethyl-4-methylimidazole and 4.2 parts of paraformaldehyde are introduced simultaneously into 130 parts of 96% strength sulfuric acid at 20°–25° C. and the mixture is stirred for 30 minutes. 12.5 parts of 3-chloro-4-amino-azobenzene→2-phenylpyrazolo[5,1-b]quinazolone are then introduced, a little at a time. The mixture is stirred for 72 hours at 20°–25° C. and the product is then isolated as described in Example 84.

Yield: 20.1 parts of the disazo dye of the formula

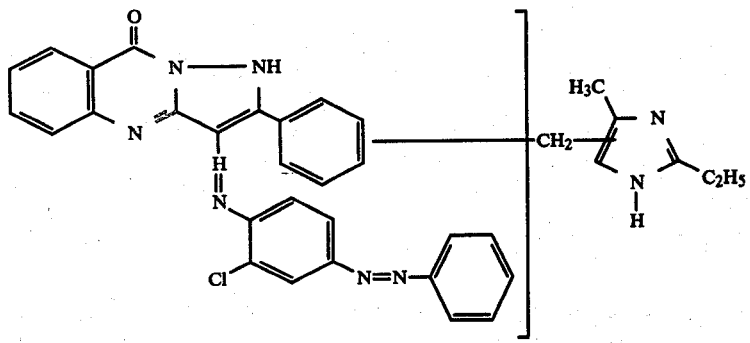

$\lambda_{max}$ 455 nm.

EXAMPLE 86

21.3 parts of 4-methylimidazole and 7.5 parts of paraformaldehyde are introduced in parallel into 165 parts of 96% strength sulfuric acid at 0°–15° C. and the mixture is stirred for one hour at 40° C. When it has cooled to 0°–5° C., 30.6 parts of 2,6-dichloro-4-nitroaniline→aminohydroquinone dimethyl ether→2-diethylamino-4-phenyl-1,3-thiazole are introduced and the batch is stirred for 30 hours at 20°–25° C. and 6 hours at 30°–35° C.

The reaction mixture is poured out onto ice water and the soluble components are precipitated by neutralizing with 25% strength ammonia; the precipitate is filtered off, washed and dried.

Yield: 33.0 parts of the disazo dye of the formula

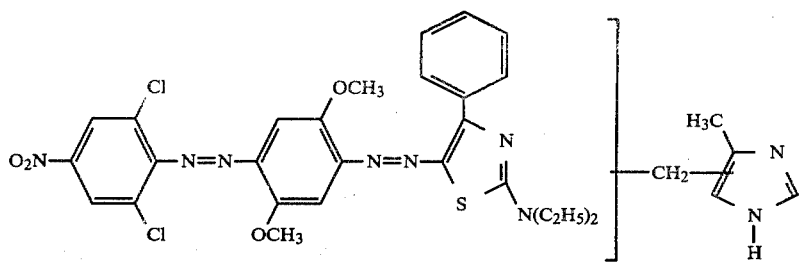

Color of a solution in dilute acetic acid: reddish blue.

EXAMPLE 87

21.3 parts of 4-methylimidazole and 7.5 parts of paraformaldehyde are introduced, in parallel, into 165 parts of 96% strength sulfuric acid at 0°–15° C. and the mixture is stirred for one hour at 40° C. When it has cooled to 30° C., 25.3 parts of C.I. Basic Blue 26, C.I. No. 44,045, are introduced and the reaction mixture is stirred for 12 hours at 40° C. It is then poured out onto ice water and the dye is precipitated with 25% strength ammonia. The precipitate is filtered off, washed salt-free and dried at 50° C. Yield: 36 parts of the triphenylmethane dye of the formula:

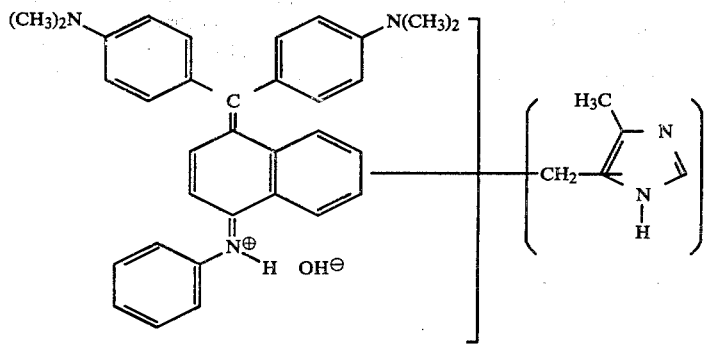

Analysis: $C_{38}H_{39}N_5O$ (molecular weight 581) calculated N 12.0%; found N 12.1%.

A solution of acetic acid is blue; $\lambda_{max}$ 614 nm. Wet-end coloring of paper gives a blue product.

EXAMPLE 88

21.3 parts of 4-methylimidazole and 7.5 parts of paraformaldehyde are introduced, in parallel, into 165 parts of 96% strength sulfuric acid at 0°–15° C. and the mixture is stirred for 2 hours at 40° C. When it has cooled to 30° C., 36.9 parts of C.I. Solvent Dye, C.I. No. 45,195, are introduced, a little at a time, and the reaction mixture is stirred first for one hour at 40° C. and then for 20 hours at 20°–25° C. It is then poured out onto ice water and the solution is neutralized with 25% strength ammonia. The precipitate is filtered off and washed salt-free with water. Yield: 42 parts of the xanthene dye of the formula

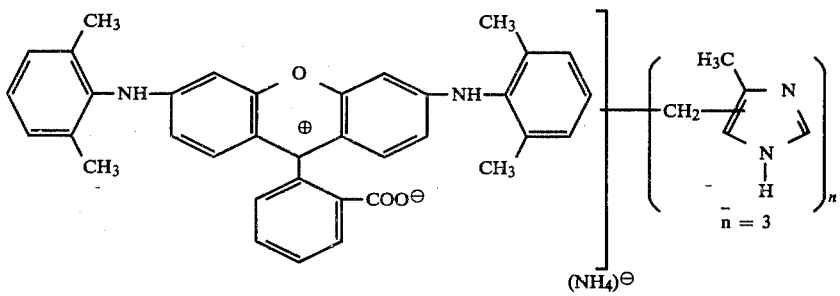

Analysis: $C_{51}H_{48}N_8O_3$ (820): calculated: N 13.6% found: N 13.0%.

NMR spectrum ($CF_3COOD$): 2.2 ppm (broad S); 2.4 ppm (S), 4.2 ppm (broad S)+aromatic signals.

Absorption maximum in a 5% strength solution of acetic acid in ethanol: 526 nm.

Employing the methods of Use Examples 1 and 2, an acetic acid solution of this dye gives brilliant red papers. The waste water is markedly less colored than when using the corresponding dye C.I. No. 45,195 which does not contain any imidazolylmethylene groups.

EXAMPLE 89

25.5 parts of C.I. Solvent Violet 10, C.I. No. 45,190:1, are introduced, a little at a time, into a mixture, prepared as in Example 88, of 4-methylimidazole and paraformaldehyde in sulfuric acid at 30° C., and the batch is stirred for 3 hours at 40° C. and then for 15 hours at 20°–25° C., after which it is worked up as described in Example 88.

Yield: 32 parts of the xanthene dye of the formula

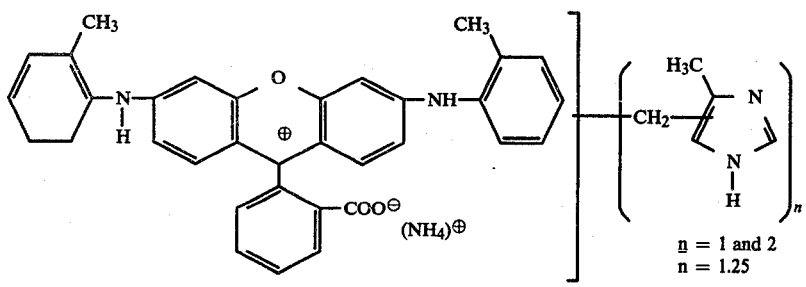

Analysis: $C_{39}H_{31}N_4O_3$ (n=1) (molecular weight 603), calculated: N 9.28%. $C_{44}H_{38}N_6O_3$ (n=2) (molecular weight 697), calculated: N 12.05%, found: N 10.0%.

A solution in acetic acid is red; $\lambda_{max}$ 530 nm (in a 5% strength solution of acetic acid in ethanol); wet-end coloring of paper gives a red product.

EXAMPLE 90

A reaction mixture of 4-methylimidazole and paraformaldehyde in sulfuric acid is first prepared as in Example 88, and 30.6 parts of a condensate of 2 moles of 2-chloroaniline and 1 mole of 3,6-dichlorofluoran are introduced, a little at a time, at 0°–5° C., after which the mixture is stirred for 15 hours at 20°–23° C. and worked up as in Example 88.

Yield: 38 parts of the xanthene dye of the formula

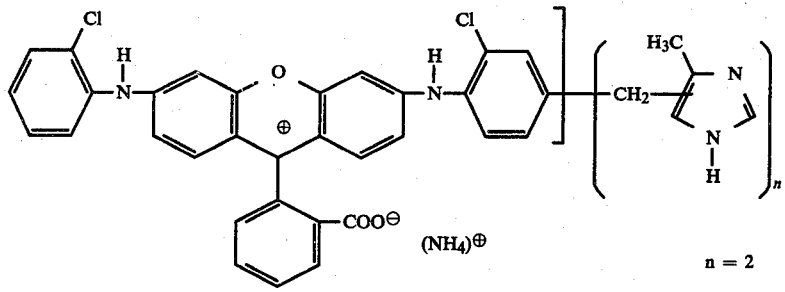

Analysis: $C_{42}H_{32}Cl_2N_6O_3$ (molecular weight 740): calculated: Cl 9.59%; found: Cl 9.56%.

A solution of the product in acetic acid is red. Wet-end coloring of paper gives a red product.

EXAMPLE 91

(a) The procedure described in Example 90 is followed, but 31.5 parts of a condensate of 2 moles of mesidine and 1 mole of 3,6-dichlorofluoran are used as the dye.

Yield: 37 parts of the dye of the formula

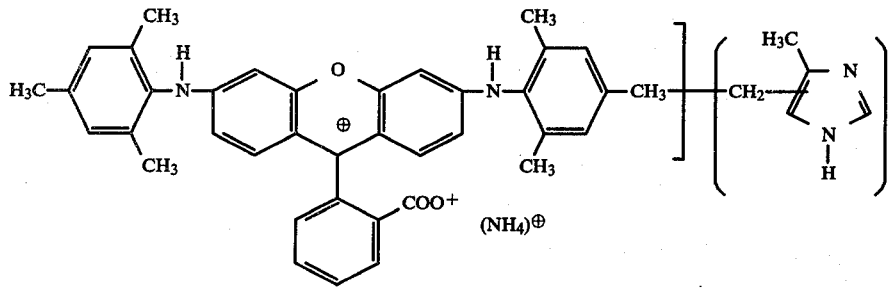

A solution of the product in acetic acid is red; $\lambda_{max}$ 528 nm. Use of a solution in acetic acid, in accordance with Use Examples 1 or 3, gives brilliant deep red papers.

(b) Imidazolylmethylation of a condensate of 2 moles of 2,6-diethylaniline and 1 mole of 3,6-dichlorofluoran, by the method of Example 90, also gives a dye having very good use characteristics.

EXAMPLE 92

(a) 24 parts of 2-(4'-aminophenyl)-6-methylbenzthiazole, in hydrochloric acid solution, are diazotized with 7.6 parts of sodium nitrite.

The diazonium salt solution is added at 0°–5° C., with stirring, to a solution which contains 39 parts of the coupling component prepared as described in (b) below, of the formula:

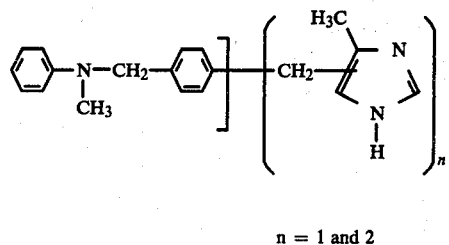

in 400 parts of ice water and 60 parts of 30% strength acetic acid. The pH of the mixture is then brought to 5.5 with sodium acetate solution and the temperature is allowed to rise to 20°-25° C. over 18 hours. The dye, which has precipitated in a very finely divided form, is filtered off and the press cake is dissolved by adding glacial acetic acid. The solution is filtered and the dye is precipitated from the filtrate, at 50°-60° C., by means of 25% strength ammonia. The precipitate is filtered off, washed salt-free with warm water, and dried at 50° C.

Yield: 47.2 parts of a golden yellow powder.

(b) Synthesis of the coupling component:

20.5 parts of 4-methylimidazole and 10 parts of paraformaldehyde are introduced, in parallel, into 130 parts of 96% strength sulfuric acid, and the mixture is stirred. When it has cooled to 0°-5° C., 19.7 parts of N-methylbenzaniline are added dropwise. The reaction mixture is stirred for 3 hours at 2°-5° C., 18 hours at 5°-20° C. and 6 hours at 30° C. It is then poured out onto ice water and the solution is brought to pH 9.0 with 25% strength ammonia. The precipitate is taken up in butanol and the butanol phase is separated off, washed with water and dried. The butanol is distilled off and the residue is used direct as the coupling component. The dye obtained as described in (a), in acetic acid solution, gives a golden yellow paper when employed in accordance with Use Example 1, 2 or 3. The waste water is colorless.

EXAMPLE 93

71.3 parts of imidazole and 45.3 parts of paraformaldehyde are introduced, a little at a time, into a mixture of 1,167 parts of 97.5% strength sulfuric acid and 115 parts of copper phthalocyanine at 20°-35° C. The reaction mixture is then heated to 110° C. and stirred at this temperature for 15 hours. When it has cooled, the reaction solution is poured out onto a mixture of 4,000 parts of ice and 1,500 parts of water and the resulting solution is brought to pH 10 with 1,900 parts of 50% strength sodium hydroxide solution. The precipitate is filtered off at 50° C. on a suction filter, and is washed neutral and salt-free with water, and dried. Yield: 153 parts of dye of the formula

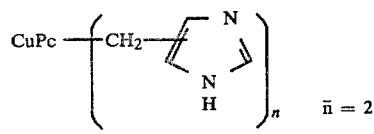

in the form of a dark blue powder. The dye is a mixture of the compounds with n=1, 2 and 3 and gives a brilliant blue solution in 30% strength acetic acid. $\lambda_{max}$ 327 and 607 nm.

EXAMPLE 94

143.8 parts of 1-ethylimidazole and 76 parts of paraformaldehyde are introduced into a mixture of 1,300 parts of 100% strength sulfuric acid and 115 parts of copper phthalocyanine at 20°-35° C. The mixture is slowly warmed to 110° C. and is stirred at this temperature for 12 hours. The reaction solution obtained is poured out onto 3,000 parts of ice and 1,000 parts of water. 900 parts of sodium chloride and 150 parts of zinc chloride are added to the solution and the resulting suspension is stirred. The precipitate is filtered off and the filter residue is washed free of sulfate ions with 10% strength sodium chloride solution and is dried at 90° C. Yield: 403 parts of dye of the formula in the

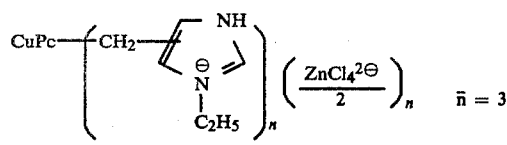

form of a dark blue powder, which gives a greenish blue solution in water. $\lambda_{max}$ 331 and 625 nm.

EXAMPLE 95

14.3 parts of cobalt phthalocyanine, 15.9 parts of 1-ethylimidazole and 7.2 parts of paraformaldehyde are introduced into 200 parts of 100% strength sulfuric acid and the mixture is stirred for 20 hours at 100°-105° C. When the reaction solution has cooled, it is poured out onto ice water and the reaction product is precipitated by adding 350 parts of 50% strength sodium hydroxide solution. The precipitate is filtered off, washed with water and dried. Yield: 13.4 parts of the dye of the formula

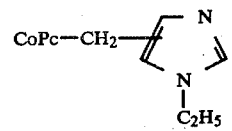

A solution in propionic acid is greenish blue.

Using the same method, 14.3 parts of nickel phthalocyanine give 21.5 parts of the corresponding nickel phthalocyanine derivative.

EXAMPLE 96

86 parts of 1-methylimidazole and 45.4 parts of paraformaldehyde are introduced in parallel into a mixture of 1,670 parts of 0.5% strength oleum and 115 parts of copper phthalocyanine at 20°-35° C. The reaction mixture is stirred for one hour, then heated to 100° C., and stirred at this temperature for 18 hours. When it has cooled, the reaction mixture is poured out onto ice water and the solution is brought to pH 10-11 with sodium hydroxide solution. The precipitate is filtered off, washed neutral and dried. Yield: 144 parts of the dye of the formula

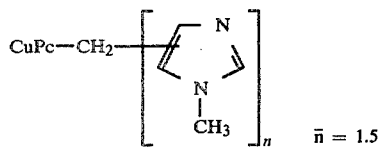

in the form of a dark blue powder. A solution in 30% strength acetic acid is brilliant blue. $\lambda_{max}$ 325 and 607 nm.

EXAMPLE 97

10.3 parts of metal-free phthalocyanine and 17.9 parts of 4-methyl-5-hydroxymethylimidazole hydrochloride are introduced into 160 parts of 98% strength sulfuric acid and the mixture is slowly heated to 80° C. and stirred at this temperature for 2 hours. The product is isolated by pouring the mixture onto water and precipitating the dye with sodium hydroxide solution, as described in Example 96. Yield: 3.6 parts of the dye of the formula

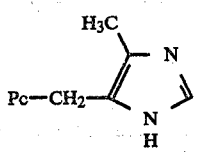

in the form of a blue powder. A solution in dilute propionic acid is lime green.

EXAMPLE 98

The procedure described in Example 97 is followed, but instead of metal-free phthalocyanine 11.4 parts of iron phthalocyanine are used, and the mixture is stirred for 5 hours at 80° C. 7.6 parts of the corresponding iron phthalocyanine derivative are obtained; the product gives a bluish green solution in dilute acetic acid.

EXAMPLE 99

15.3 parts of copper phthalocyanine, 7.1 parts of paraformaldehyde and 22.5 parts of 1-butyl-2-methylimidazole are introduced into 200 parts of 100% strength sulfuric acid and the mixture is stirred for one hour at 20°–30° C. and then for 18 hours at 100° C. It is then poured out onto ice water and rendered alkaline with sodium hydroxide solution, and the dye is filtered off, washed salt-free with water and dried. Yield: 21.5 parts of the dye of the formula

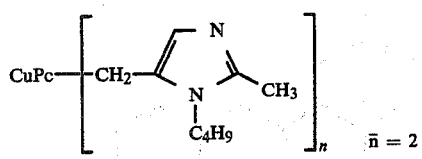

in the form of a reddish blue powder. A solution in 20% strength acetic acid is brilliant blue.

EXAMPLE 100

A mixture of 200 parts of 100% strength sulfuric acid, 14.3 parts of copper phthalocyanine, 27.25 parts of 2-isopropylimidazole and 12.75 parts of paraformaldehyde is stirred for one hour at 30°–35° C. and 24 hours at 100° C. The product is isolated as described in Example 96. Yield: 21.8 parts of the dye of the formula

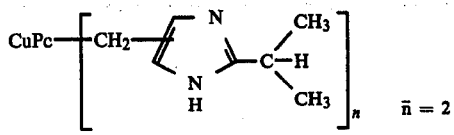

A solution in 20% strength propionic acid is brilliant blue.

If instead of 2-isopropylimidazole 24 parts of 1,2-dimethylimidazole are used, 29.9 parts of the corresponding bis-(dimethylimidazolylmethylene)-copper-phthalocyanine are obtained.

EXAMPLE 101

A mixture of 200 parts of 100% strength sulfuric acid, 15.3 parts of copper phthalocyanine, 15.3 parts of 1-vinylimidazole and 7.1 parts of paraformaldehyde is stirred for 18 hours at 100° C. and is then worked up as described in Example 96. Yield: 20 parts of a pale blue dye which dissolves readily in dilute acetic acid.

EXAMPLE 102

A mixture of 250 parts of 5% strength oleum, 16.6 parts of dibenzopyrene-quinone, 24 parts of 1-ethylimidazole and 12.8 parts of paraformaldehyde is stirred for 16 hours at 20°–30° C. and then for 10 hours at 80° C. and 8 hours at 90° C. The reaction mixture is then poured onto ice water and the precipitate is filtered off, washed with water and dried. Yield: 25 parts of the dye of the formula

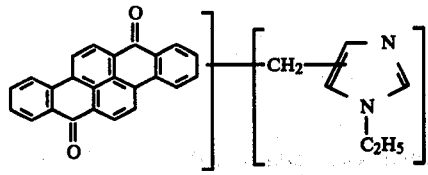

$\bar{n}=1.2$, ie. the product is a mixture of the compounds with $n=1$ and $n=2$.

A solution in dilute acetic acid is yellowish brown.

EXAMPLE 103

20.3 parts of pyranthrone, 24 parts of 1-ethylimidazole and 12.8 parts of paraformaldehyde are introduced, a little at a time, into 250 parts of 5% strength oleum. The mixture is stirred for 16 hours at 20°–25° C. and 12 hours at 80° C. When it has cooled, the reaction mixture is poured out onto ice water and the batch is brought to pH 7.0 with 395 parts of 50% strength sodium hydroxide solution. The precipitate is filtered off, washed with water and dried.

Yield: 33 parts of the dye of the formula

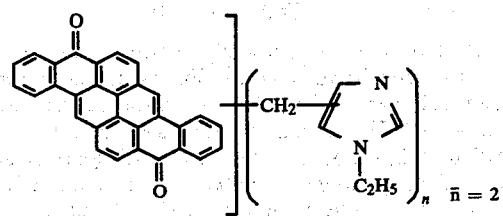

10.3 parts of the dry powder, in 100 parts of dioxane, are quaternized by treatment with 2.8 parts of dimethyl sulfate for 10 hours at 50° C. The quaternary ammonium compound is isolated from the solution by distilling off the solvent. Yield: 14 parts. The product is readily soluble in water.

EXAMPLE 104

22.3 parts of 1,4-bis-phenylethylaminoanthraquinone and 28.1 parts of 4-methyl-5-hydroxymethylimidazole are introduced into a mixture of 500 parts of 85% strength phosphoric acid and 197.5 parts of phosphorus pentoxide at 25°–30° C. and the mixture is stirred for 8 hours at 60°–65° C. and 2 hours at 110° C. It is cooled and poured out onto water, and the reaction product is precipitated with sodium hydroxide solution and filtered off. The filter residue is triturated with 10% strength sodium carbonate solution, filtered off and washed neutral. Yield: 21 parts of the dye of the formula

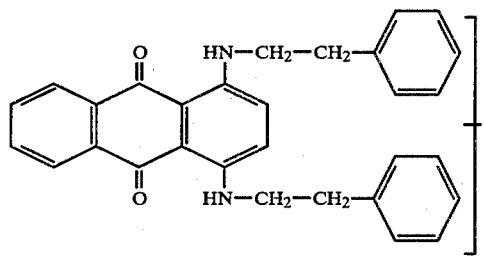

A solution in dilute acetic acid is blue.

EXAMPLE 105

A mixture of 22.2 parts of indanthrone and 18.6 parts of 4-methyl-5-hydroxymethylimidazole is introduced into 250 parts of 98–99% strength sulfuric acid at 50°–65° C. The reaction mixture is stirred for 2 hours at 60°–65° C., 6 hours at 70° C. and 15 hours at 80° C., cooled and poured onto 1,000 parts of ice water, and the batch is brought to pH 10 with 300 parts of 50% strength sodium hydroxide solution. The precipitate is filtered off, washed neutral and dried. Yield: 30 parts of the dye of the formula

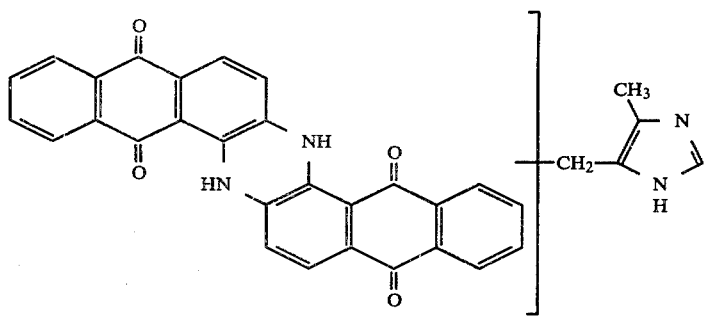

The dye gives a dark blue solution in dilute acetic acid.

EXAMPLE 106

A mixture of 250 parts of 5% strength oleum, 23.2 parts of perylenetetracarboxylic acid dimethylimide, 12.8 parts of paraformaldehyde and 24 parts of 1-ethylimidazole is stirred for 12 hours at 20°–25° C. and 12 hours at 100° C. The dye solution is poured out onto ice water and brought to pH 7.0 with 50% strength sodium hydroxide solution, and the precipitate is filtered off, washed neutral with water and dried. Yield: 37 g of the dye of the formula

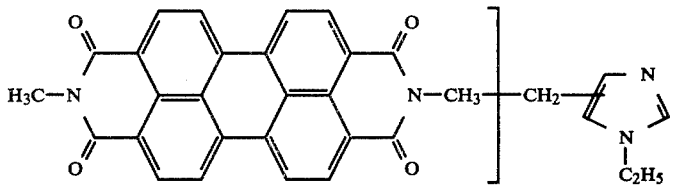

The dye gives a red solution in dilute aqueous propionic acid.

EXAMPLE 107

A mixture of 13.6 parts of 4-methyl-5-hydroxymethylimidazole and 21.4 parts of the anthraquinonebisacridone of the formula (VIII)

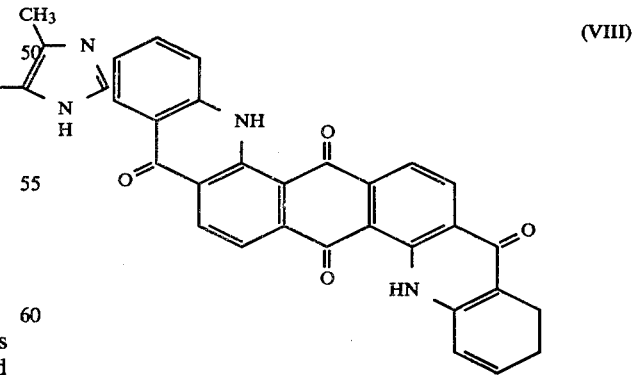

(VIII)

is introduced into 250 parts of 98% strength sulfuric acid and the batch is stirred for 4 hours at 90° C. When it has cooled, the reaction mixture is poured out onto water and the product is precipitated by adding 430 parts of 50% strength sodium hydroxide solution to bring the pH to 10. The precipitate is filtered off, washed neutral and dried. Yield: 28 parts of the dye

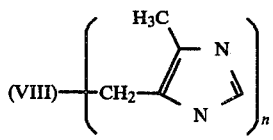

where n=1.

The dye gives a violet solution in dilute acetic acid. $\lambda_{max}$ 545 nm (0.060 g/l of 5% strength acetic acid).

If instead of the bisacridone 16.4 parts of 2-amino-3,4-phthaloylacridone are used and the mixture is stirred first for 3 hours at 60° C. and then for 8 hours at 80° C., 21 parts of the dye of the formula

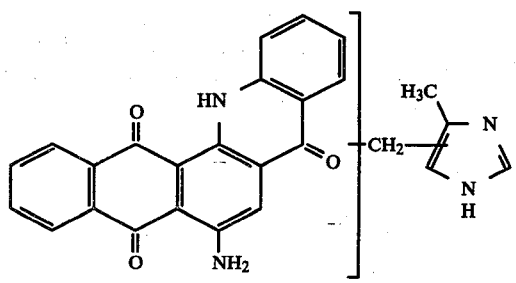

are isolated. The dye gives a blue solution in dilute acetic acid.

EXAMPLE 108

A mixture of 18.8 parts of 8,9-phthaloyl-benz[a]acridone and 11.4 parts of 4-methyl-hydroxymethylimidazole is introduced into 190 parts of 96% strength sulfuric acid and the batch is stirred for 5 hours at 40°–45° C. and 8 hours at 60°–65° C. The dye is isolated as described in Example 107. 27.5 parts of the dye of the formula

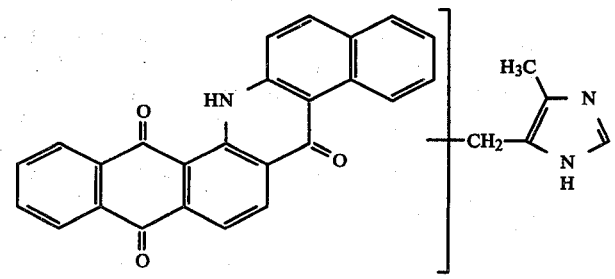

are obtained. The dye gives an orange red solution in dilute acetic acid.

EXAMPLE 109

A mixture of 220 parts of 99.8% strength sulfuric acid, 22.8 parts of violanthrone, 20.5 parts of 1-methylimidazole and 10.5 parts of paraformaldehyde is stirred for 18 hours at 100°–105° C. The reaction solution is poured out onto about 2,000 parts of ice water, 470 parts of 50% strength sodium hydroxide solution are added and the product is filtered off, washed with water and dried. Yield: 40 parts of the dye of the formula

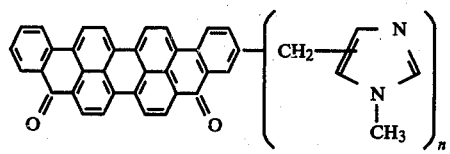

$\bar{n} = 2$

The dye gives a navy solution in dilute propionic acid. $\lambda_{max}$ 570 nm.

EXAMPLE 110

The procedure described in Example 109 is followed, but instead of violanthrone an equal amount of isoviolanthrone is used. 32.5 parts of the dye of the formula

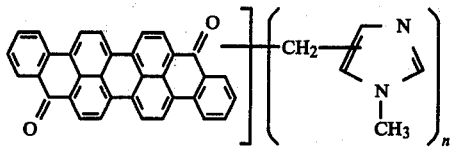

where n=1.5, are isolated, ie. the product is a mixture of the compounds with n=1 and n=2.

The dye gives a violet solution in dilute propionic acid. $\lambda_{max}$ 555 nm.

EXAMPLE 111

The procedure described in Example 109 is followed, but the violanthrone is replaced by 21.1 parts of benzanthrone-pyrazolanthrone and the mixture is stirred for 4 hours at 80° C. and then for 7 hours at 90° C. Yield: 31 parts of the dye of the formula

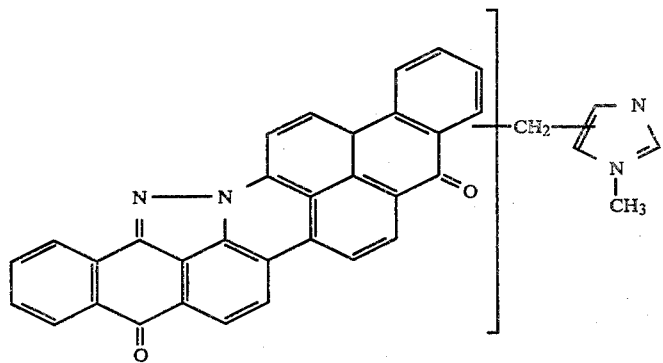

The dye gives a blue solution in acetic acid.

EXAMPLE 112

16.8 parts of 4-methyl-5-hydroxymethylimidazole are introduced into a solution of 23.7 parts of the anthraquinone-bis-thiazole of the formula (IX)

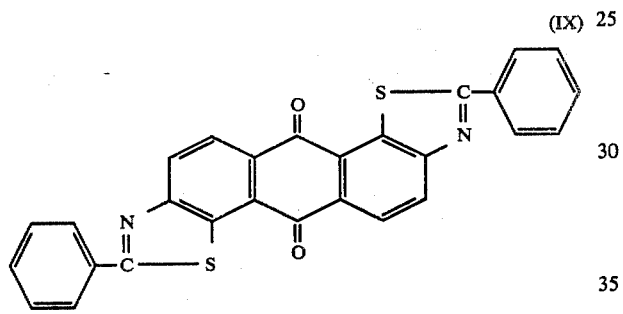

in 210 parts of 98% strength sulfuric acid, at 20°–30° C. The reaction mixture is stirred for 2 hours at room temperature, then for 7 hours at 80° C. and finally for 7 hours at 90° C. When it has cooled, the reaction mixture is introduced into ice water and the product is precipitated by neutralizing with sodium hydroxide solution. The precipitate is filtered off, washed salt-free with water and dried. Yield: 34 parts of the dye

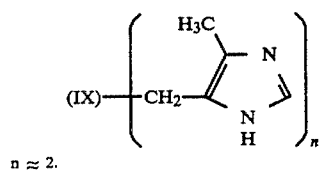

n ≈ 2.

The dye gives a yellow solution in dilute acetic acid.

$\lambda_{max}$ 266, 305 and 413 nm. The main absorption band is at 305 nm.

EXAMPLE 113

11.4 parts of 4-methyl-5-hydroxymethyl-imidazole are introduced into a solution of 27.2 parts of the compound of the formula (X)

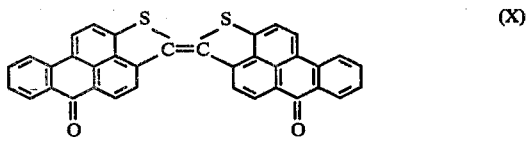

in 300 parts of sulfuric acid monohydrate, and the mixture is stirred for 7 hours at 100° C. and 12 hours at 115° C.

The dye is precipitated in a mixture of ice water and sodium hydroxide solution, washed neutral and dried at 80° C. Yield: 40 parts of the product

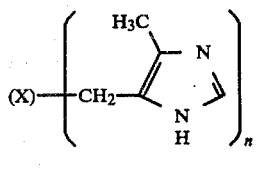

n ≈ 2.

The dye gives an olive green solution in acetic acid.

EXAMPLE 114

20.6 parts of naphthoylenebenzimidazole, 250 parts of sulfuric acid monohydrate and 11.4 parts of 4-methyl-5-hydroxymethylimidazole are stirred for 4 hours at 105° C. The product is precipitated by pouring the reaction solution onto a mixture of ice water and sodium hydroxide solution, and is filtered off and washed salt-free. Yield: 30.7 parts of the dye of the formula

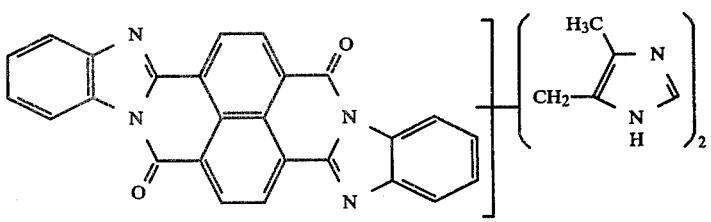

The dye gives an orange red solution in dilute acetic acid. $\lambda_{max}$ 462 nm.

Analysis: $C_{36}H_{24}N_8O_2$ (600): calculated: N 18.6%, found: N 18.6%.

EXAMPLE 115

A mixture consisting of 24.5 parts of dichlorodibromoindigo and 23 parts of 4-methyl-5-hydroxymethylimidazole is introduced, a little at a time, into 250 parts of sulfuric acid monohydrate at 55°–60° C. and the batch is stirred for 6 hours at the same temperature. When it has cooled, it is poured out onto ice water, the mixture is rendered alkaline with potassium hydroxide solution and the product is filtered off and washed neutral with water. Yield: 33.3 parts of the dye of the formula

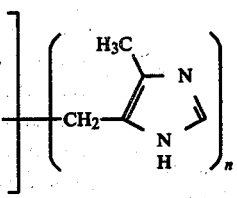

$\bar{n} \approx 2$

The dye gives a dark blue solution in dilute propionic acid.

EXAMPLE 116

30 parts of 2,4-bis-(1-anthraquinoylamino)-6-phenyl-1,3,5-triazine are dissolved in 240 parts of 99% strength sulfuric acid, 10.3 parts of 1-methylimidazole and 4.5 parts of paraformaldehyde are introduced simultaneously and the mixture is stirred for 10 hours at 90° C. and then for 5 hours at 100° C. When it has cooled, the mixture is poured out onto ice water, the pH is brought to 10 with sodium hydroxide solution and the precipitate is filtered off and washed with water. Yield: 35 parts of the dye of the formula

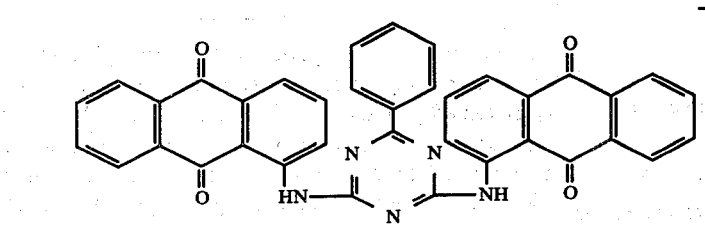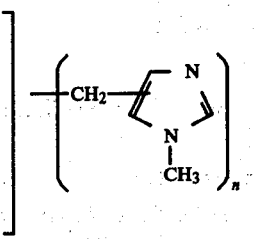

$\bar{n} \approx 2$.

The dye gives a yellow solution in dilute acetic acid.

EXAMPLE 117

21 parts of 1,5-di-p-toluidino-anthraquinone and 13.5 parts of 4-methyl-5-hydroxy-methylimidazole are introduced into 210 parts of 96% strength sulfuric acid and the mixture is stirred for 30 minutes at 20°–30° C. and then for 90 minutes at 70° C. When it has cooled, it is poured out onto ice water, the pH is brought to 10.0 with sodium hydroxide solution and the precipitate is filtered off, washed neutral and dried. Yield: 27.5 parts of the dye of the formula

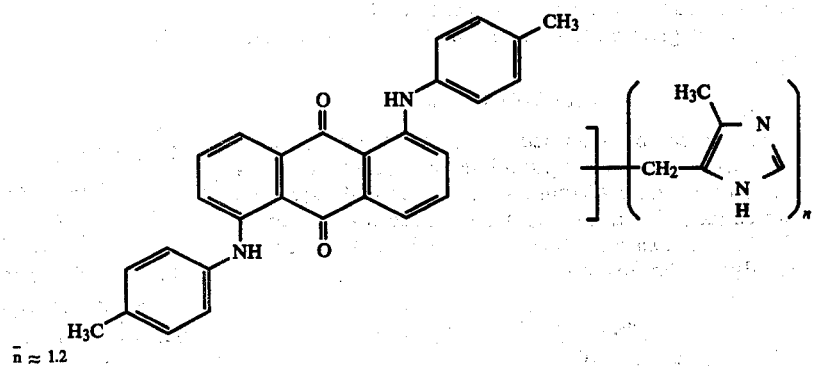

$\bar{n} \approx 1.2$

The dye gives a bluish red solution in 30% strength acetic acid.

EXAMPLE 118

The procedure described in Example 117 is followed, but instead of 1,5-di-p-toluidino-anthraquinone 21 parts of 1,4-di-p-toluidino-anthraquinone are employed and the mixture is stirred for 20 hours at 20°–25° C. 28 parts of the dye of the formula

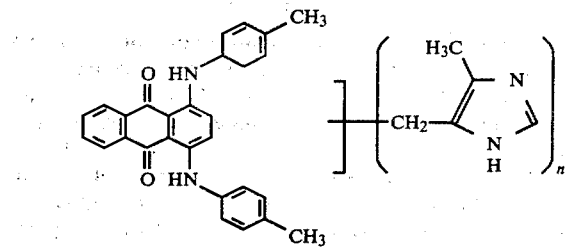

where n̄=3, are obtained, ie. the product is a mixture of the compounds with n=2, n=3 and n=4.

The dye gives a bluish green solution in dilute acetic acid.

EXAMPLE 119

The procedure described in Example 117 is followed, but instead of 1,5-di-p-toluidino-anthraquinone 20.4 parts of 1-amino-2-bromo-4-p-toluidino-anthraquinone are employed and the mixture is stirred for 6 hours at 40° C. and then for 7 hours at 60°–65° C. 30.5 parts of the dye of the formula

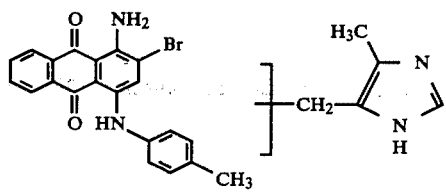

are obtained.

The dye gives a dark blue solution in 30% strength acetic acid.

EXAMPLE 120

23.8 parts of 1,4-bis-(2'-phenyl-propylamino)-anthraquinone and 16.8 parts of 4-methyl-5-hydroxymethylimidazole are introduced in parallel, a little at a time, into 210 parts of 98% strength sulfuric acid and the mixture is stirred. After 20 hours at 20°–25° C., the mixture is poured out onto ice water, sodium hydroxide solution is added until precipitation is complete, and the precipitate is filtered off, washed neutral and dried at 60° C. Yield: 32.2 parts of the dye of the formula

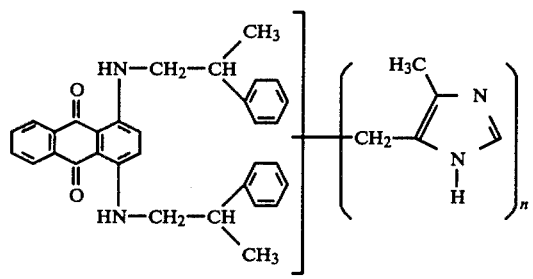

n̄ = 2

The dye gives a clear blue solution in dilute propionic acid.

EXAMPLE 121

The procedure described in Example 120 is followed, but instead of 1,4-bis-(2'-phenylpropylamine)-anthraquinone 19.5 parts of 1-nitro-8-o-toluidino-4,5-dihydroxyanthraquinone are employed and the batch is stirred for 7 hours at 90° C. and then for 15 hours at 100°–102° C. Yield: 28 parts of the dye of the formula

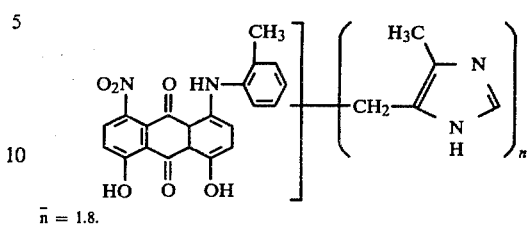

n̄ = 1.8.

The dye gives a blue solution in dilute acetic acid.

EXAMPLE 122

12.2 parts of AlPc of the formula $C_{32}H_{16}N_8AlCl.2-H_2O$, 4.2 parts of paraformaldehyde and 8.2 parts of 1-methylimidazole are introduced in parallel into 120 parts of sulfuric acid monohydrate, whilst stirring, and dissolved in the acid at 30° C. The mixture is heated to 100° C., stirred at this temperature for 15 hours, then cooled and precipitated by pouring onto ice water. The batch is brought to pH 10 with sodium hydroxide solution and the product is filtered off, washed and dried. Yield: 14.5 parts of an imidazolylmethylene-aluminum-phthalocyanine, which gives a greenish blue solution in dilute acetic acid.

EXAMPLE 123

A mixture of 29.8 parts of thioindigo and 28.2 parts of 4-methyl-5-hydroxymethylimidazole is introduced into 420 parts of 96% strength sulfuric acid at 20°–30° C. and the batch is stirred for several hours at this temperature, and then for 7 hours at 40° C. and 7 hours at 60° C. The cooled solution is poured out onto ice water and the reaction product is precipitated with 850 parts of 50% strength sodium hydroxide solution. The precipitate is filtered off, washed neutral and salt-free and dried at 60° C. Yield: 45 parts of the dye of the formula

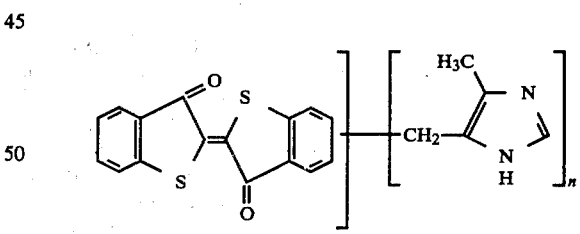

where n̄=1.7, ie. the product is a mixture of the compounds with n=1 and n=2.

EXAMPLE 124

A mixture of 19.9 parts of 1-amino-2-phenoxy-4-hydroxy-anthraquinone and 21.5 parts of 4-methyl-5-hydroxymethylimidazole is introduced into 210 parts of 98% strength sulfuric acid. The reaction mixture is stirred for 20 hours at 20°–25° C. and then poured onto 2,000 parts of ice water and brought to pH 10 with 400 parts of 50% strength sodium hydroxide solution. The precipitate is filtered off and washed neutral. Yield: 26.5 parts of the dye of the formula

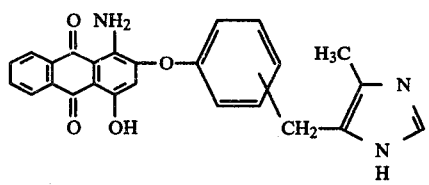

Analysis: $C_{25}H_{18}N_3O_4$ (424) calculated N 9.9%; found N 10.0%.

A solution in dilute acetic acid is red.

EXAMPLE 125

The procedure described in Example 124 is followed, but instead of 1-amino-2-phenoxy-4-hydroxy-anthraquinone 21.9 parts of 1-amino-2-(4'-chlorophenyl)-4-hydroxy-anthraquinone are employed and the mixture is stirred for 12 hours at 60° C. Yield: 10 parts of the dye of the formula

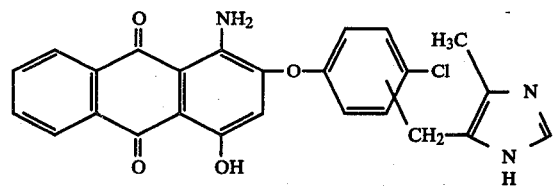

EXAMPLE 126

The procedure described in Example 124 is followed, but instead of 1-amino-2-phenoxy-4-hydroxy-anthraquinone 15 parts of 1-amino-2-thiophenyl-4-hydroxy-anthraquinone are employed and the mixture is stirred for 8 hours at 50° C. Yield: 20 parts of the dye of the formula

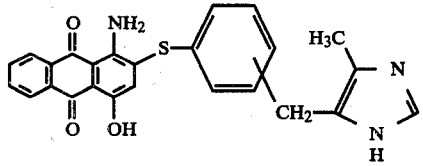

Analysis: $C_{25}H_{18}N_3O_3S$ (440) calculated N 9.54, S 7.2%; found N 9.6, S 7.6%.

The dye gives a bluish red solution in dilute acetic acid.

EXAMPLE 127

A mixture of 220 parts of 100% strength sulfuric acid, 11.4 parts of 4-methyl-5-hydroxymethylimidazole and 22.5 parts of the benzanthrone derivative of the formula (XI)

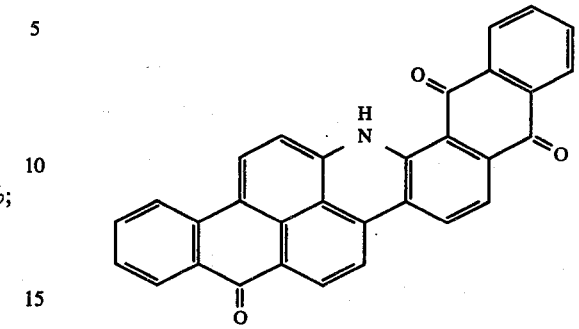

is stirred for several hours at room temperature and then for 7 hours at 60°–70° C. The reaction mixture is poured onto 2,000 parts of ice water and the product is precipitated by adding 320 parts of 50% strength sodium hydroxide solution, so as to bring the pH to 10. The precipitate is filtered off, washed neutral and dried at 110° C. Yield: 24.1 parts of the dye

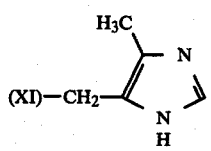

The dye gives a bluish green solution in dilute acetic acid.

EXAMPLE 128

A mixture of 220 parts of 1% strength oleum, 20.3 parts of acedianthrone and 13.6 parts of 4-methyl-5-hydroxymethylimidazole is stirred for one hour at 30° C. and 2 hours at 90° C. When it has cooled, it is poured out onto ice water and neutralized with sodium hydroxide solution. The precipitate is filtered off, washed salt-free and dried. Yield: 24.2 parts of the dye of the formula

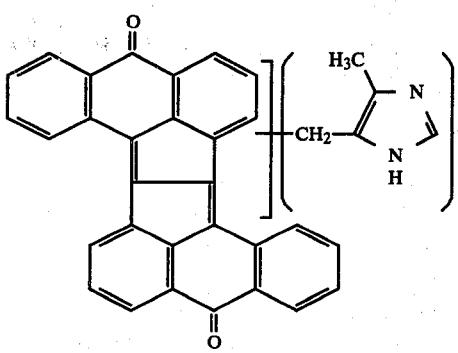

The dye gives a yellowish brown solution in dilute acetic acid.

EXAMPLE 129

A mixture of 250 parts of sulfuric acid monohydrate, 15 parts of 4-methyl-5-hydroxymethylimidazole and 22.5 parts of 9-(anthraquinon-1'-yl-amino)-benzanthrone is stirred for one hour at 80° C. When it has cooled, the mixture is poured out onto ice water and the product is precipitated with sodium hydroxide solution. The precipitate is filtered off, washed neutral and dried. Yield: 27 parts of the dye of the formula

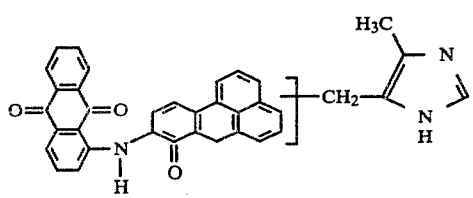

The dye gives a brown solution in dilute acetic acid.

EXAMPLE 130

45 parts of water, 10 parts of 40% strength acetic acid and 16 parts of the dye obtained in Example 96 are heated at 45°–50° C. until solution is complete. 5.6 parts of dimethyl sulfate are then added and the mixture is stirred for 2 hours at 50°–52° C. The excess dimethyl sulfate is destroyed with dilute ammonia. The dye is precipitated at about 20° C. by adding 119 parts of propanol, and is filtered off and washed with a small amount of acetone. Yield: 21 parts of quaternary ammonium compound of the formula

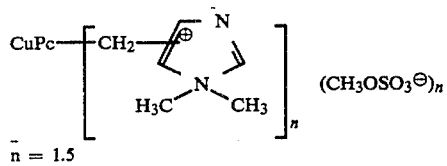

The compound gives a clear greenish blue solution in water.

EXAMPLE 131

23.7 parts of anthraquinone-bis-thiazole of the formula IX are dissolved in 250 parts of sulfuric acid monohydrate. 16.4 parts of 4-methylimidazole and 8.3 parts of paraformaldehyde are then introduced, in parallel. The reaction solution is stirred for 20 hours at 25° C. and 7 hours at 50° C., poured onto ice water and brought to pH 10 with 50% strength sodium hydroxide solution. The precipitate is filtered off, washed neutral and salt-free with water, and dried at 80° C. Yield: 34.8 parts of the dye of the formula

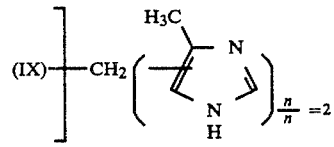

Analysis: atomic ratio S:N=1:3.
A solution in dilute acetic acid is yellow.

EXAMPLE 132

22.8 parts of isoviolanthrane are introduced into 220 parts of sulfuric acid monohydrate and dissolved therein. 20.5 parts of 4-methylimidazole and 10.5 parts of paraformaldehyde are then introduced in parallel and the mixture is stirred for one hour at 25°–30° C. and 5 hours at 100° C. The reaction solution is poured out onto 1,500 parts of ice water and brought to pH 10 with 50% strength sodium hydroxide solution. The precipitate is filtered off and washed neutral and salt-free with water. Yield: 42.2 parts of the dye of the formula

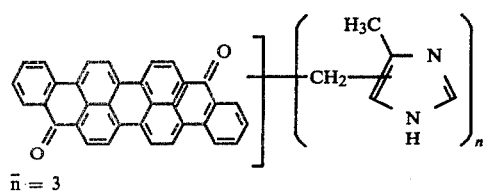

Analysis: $C_{49}H_{34}N_6O_2$ (738), calculated: N 11.4%, found: 11.1%.

A solution in acetic acid is reddish blue. $\lambda_{max}$ 557 nm.

EXAMPLE 133

22.2 parts of 4-methylimidazole are introduced into 280 parts of sulfuric acid monohydrate and 8.3 parts of paraformaldehyde are then added, a little at a time. The mixture is stirred for 60 hours at 25° C. and is then poured out onto 2,000 parts of ice water and brought to pH 10 with about 420 parts of 50% strength sodium hydroxide solution. The precipitate is filtered off and washed neutral and salt-free with water.

Yield: 31.7 parts of the dye of the formula

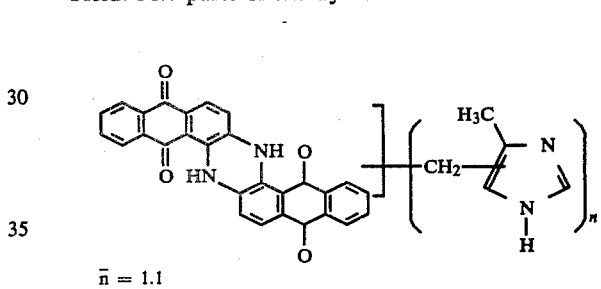

Analysis: $C_{33}H_{20}N_4O_4$ (536), calculated N 10.45%, found N 10.7%.

A solution in 25% strength acetic acid is blue. $\lambda_{max}$ 677 nm (0.040 g/l).

EXAMPLE 134

86.1 parts of copper phthalocyanine are dissolved in 690 parts of sulfuric acid monohydrate and 46.5 parts of 4-methylimidazole and 24.75 parts of paraformaldehyde are then introduced, in parallel, at 20°–30° C. The mixture is stirred for 30 minutes at 30°–40° C. and then heated to 98°–100° C. and stirred at this temperature for 10 hours. When it has cooled, the reaction mixture is poured out onto ice water and the solution is brought to pH 10–11 with sodium hydroxide solution. The precipitate is filtered off, washed neutral and salt-free and dried at 100° C.

Yield: 42.4 parts of the dye of the formula

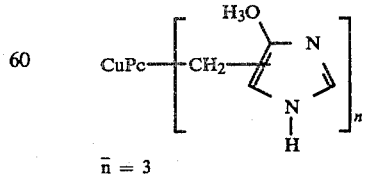

Atomic ratio Cu:N=1:14.
A solution in acetic acid is greenish blue. $\lambda_{max}$ 327 and 607 nm.

EXAMPLE 135

8.6 parts of 4-methylimidazole and 4.2 parts of paraformaldehyde are introduced into 140 parts of 96% strength sulfuric acid and the mixture is stirred for 30 minutes at 40° C. 12 parts of 4,4'-bis-(6-methylbenzthiazol-2-yl)-azobenzene (prepared as described in Helv. Chim. Acta 1944, 27) are then added at 10°-20° C. The mixture is brought to 60° C. in the course of 30 minutes and stirred at this temperature for 3 hours. The solution is poured out onto ice water and neutralized with 25% strength ammonia, whilst cooling. The precipitate is filtered off, washed and dried at 70° C.

Yield: 15.7 parts of the dye of the formula

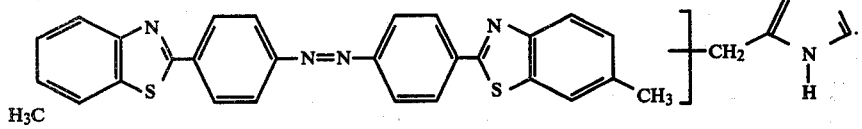

The product gives a yellow solution in dilute acetic acid. $\lambda_{max}$ 237 and 380 nm.

EXAMPLE 136

75 parts of 2-chloroethan-1-ol and 19 parts of the dye obtained according to Example 96 are stirred for 1 hour at 80° C. and for 2 hours at 90°-95° C. After cooling to 20° C. the dye is precipitated by adding 200 parts of acetone, and the precipitate is filtered off, washed with acetone and dried at 30° C.

Yield: 22.3 parts of a quaternary ammonium compound of the formula

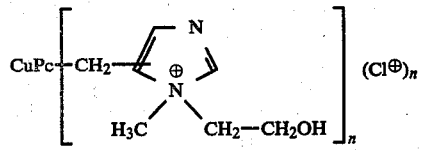

where $\bar{n}$ is 1.5.

The compound dissolves in water with a clear turquoise hue. $\lambda_{max}$ 325 and 607 nm. Paper is colored in the same hue, with a colorless waste water.

USE EXAMPLE 1

50 g of ligneous waste paper is pulped in one liter of water (10° German hardness) at room temperature, to give a fiber suspension, which is then diluted with 1 liter of the same water. A mixture of 2 g of a 10% strength acetic acid solution of the dye of Example 64 and 10 ml of water is added to the suspension. The resulting mixture is stirred gently for 15 minutes and then diluted to 0.5% solids content with water. Paper sheets weighing 80 g/m² are prepared from this suspension on a laboratory sheet-forming apparatus from Franck, and the moist sheets are dried for 5 minutes at 100° C. A red wrapping paper is obtained. The waste water is colorless. The colored paper is very fast to bleeding, according to DIN 53,991, and is also very lightfast.

Equally good results are obtained if the waste paper is replaced by (a) a mixture of 30% of birch sulfate cellulose and 70% of spruce sulfate cellulose, or by (b) spruce sulfite cellulose or by (c) spruce sulfate cellulose.

Orange red to red papers having excellent fastness characteristics are obtained.

USE EXAMPLE 2

15 kg of ligneous waste paper, 25 kg of bleached groundwood and 10 kg of unbleached sulfate cellulose are beaten in a pulper to give a 3% strength aqueous stock suspension. The latter is diluted to 2% strength in a coloring chest. The following are then added successively to the suspension, whilst stirring (the amounts being based on total dry fiber): 0.5% of soluble oxidatively degraded corn starch, 5% of kaolin and 1.25 kg of a 5% strength acetic acid solution of the dye from Example 64. After 20 minutes, 1% (based on dry weight of

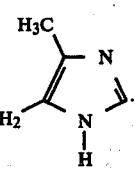

fiber) of a resin size dispersion is added to the stock in the blending chest. The homogeneous stock suspension is brought to pH 5 with alum on the papermaking machine, shortly before the headbox.

A machine-finished bag paper weighing 80 g/m² is produced; the paper has a medium red hue, with good fastness to bleeding, according to DIN 53,991.

USE EXAMPLE 3

25 kg of catalog paper (spoilage), 60 kg of bleached groundwood (65° Schopper-Riegler) and 15 kg of unbleached sulfite cellulose are beated in 2,500 l of water in a pulper. 0.4% of soluble starch, 16% of kaolin and 2% of talc (in each case based on dry fiber) are added to the 4% strength aqueous stock suspension. The latter is then refined to 45° Schopper-Riegler on a refiner. 12 kg of a 10% strength acetic acid solution of the dye from Example 64 are added (equivalent to 1%, based on dry fiber, of the dry red dye). After allowing 15 minutes for the dye to be absorbed, resin size dispersion (in an amount equivalent to 0.6%, based on fiber, of dry resin) is added to the stock. After 10 minutes, the stock leaving the blending chest is diluted continuously with water to 0.8% fiber content and is continuously brought to pH 4.5 (measured in the backwater) by means of alum (Al$_2$(SO$_4$)$_3$.18 H$_2$O) and pumped into the headbox.

A yellowish red catalog paper (60 g/m²) having good fastness to water is obtained.

If instead of the dye from Example 64, one of the dyes of Examples 65 to 69 is used, reddish orange to orange paper having good wetfastness is obtained.

We claim:
1. A dye of the formula:

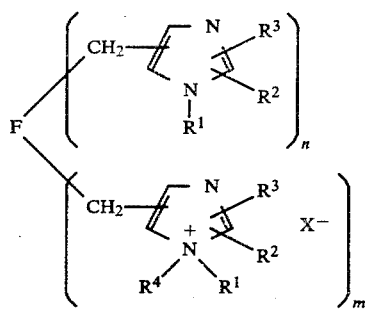

where $R^1$ is hydrogen, $C_1$–$C_6$-alkyl or $C_2$–$C_6$-alkenyl, $R^2$ and $R^3$ independently of one another are hydrogen, $C_1$–$C_5$-alkyl or $C_2$–$C_5$-alkenyl, $R^4$ is $C_1$–$C_{12}$-alkyl or hydroxy-$C_2$–$C_4$-alkyl, $X^-$ is one equivalent of an anion, F is an (m+n)-valent radical of a monoazo dye, a polyazo dye, a quinophthalone, a bis-dioxazine, a compound of the 5,6-arylo-2-pyrone series, a naphtholactam dye, a triphenylmethane dye, a xanthene dye, a phthalocyanine, an indigoid, and anthraquinone dye containing one or more phenyl or naphthyl groups, a more highly fused carbonyl-containing dye, a quinacridone, a perylene-3,4,9,10-tetracarboxylic acid diimide, an anthrapyrimidine, a pyrazoloanthrone, a diaminonaphthoquinone, a naphthazarine or a naphthalene-1,4,5,8-tetracarboxylic acid diimide, m is from 0 to 5 and n is from 0 to 5, with $1 \leq (m+n) \leq 5$, wherein the methylene group which links the imidazole radical to the dye F being attached on one side to a carbon atom of an aromatic ring of dye F and on the other side to one of the three carbon atoms of the imidazole ring.

2. The dye as claimed in claim 1 wherein $R^1$ and $R^2$ independently of one another are hydrogen or $C_1$–$C_4$-alkyl, $R^3$ is hydrogen and $R^4$ is $C_1$–$C_4$-alkyl or hydroxy-$C_2$–$C_4$-alkyl, and (n+m) is from 1 to 4.

3. A dye as claimed in claim 1, wherein $R^1$ and $R^2$ independently of one another are hydrogen or $C_1$–$C_4$-alkyl, $R^3$ is hydrogen, n is from 1 to 4 and m is 0.

4. A dye as claimed in claim 1, wherein $R^1$ and $R^3$ are hydrogen, $R^2$ is 4-methyl, n is from 1 to 4 and m is 0.

5. A dye of the formula:

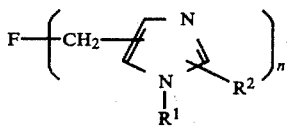

wherein $R^1$ and $R^2$ independently of one another are hydrogen or $C_1$–$C_4$-alkyl, n is from 1 to 4 and F is an n-valent radical which is derived (a) from a coupling product of an aromatic carbocyclic diamine with β-naphthol, with a β-naphthol derivative or with an acetoacetanilide, (b) from a coupling product of an aromatic carbocyclic diamine with a pyrazol-5-one compound, (c) from a coupling product of an unsubstituted or substituted aminoazobenzene with a pyrazol-5-one compound, (d) from a dye of the formula:

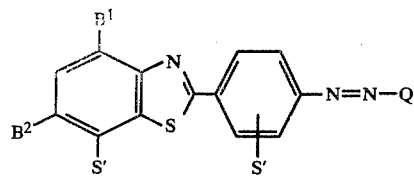

where Q is a radical of the formula:

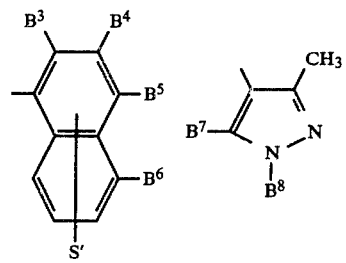

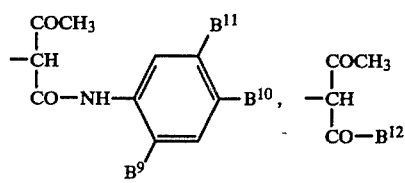

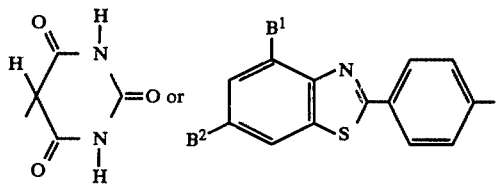

$B^1$ is hydrogen or methyl, $B^2$ is a hydrogen, methyl or ethyl, $X'$ is a sulfonic acid group or hydrogen, $B^3$ is hydrogen, hydroxyl, amino, 2-hydroxyethylamino, methylamino or phenylamino, $B^4$ is hydrogen, acetyl or N-phenylcarbamyl, $B^5$ is hydrogen, hydroxyl, methyl, methoxy, chlorine, bromine, 2-hydroxyethylamino or dimethylamino, but either $B^3$ or $B^5$ must be hydroxyl, $B^6$ is hydrogen, methyl or methoxy, $B^7$ is hydroxyl or amino, $B^8$ is phenyl or 4-methoxyphenyl, $B^9$ is hydrogen, methyl or methoxy, $B^{10}$ is hydrogen or chlorine, $B^{11}$ is hydrogen or methoxy and $B^{12}$ is methoxy, butoxy, amino, methylamino, phenoxy, 4-methylphenoxy or 3-methyl-4-methoxyphenoxy, (e) from a dye of the formula:

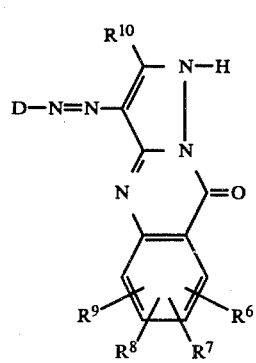

where D is phenyl which is unsubstituted or substituted by one or two substituents chosen from chlorine, nitro, methoxy, methyl, phenylazo or tolylazo, the substituents, when two are present, being identical or different except in the case of the phenylazo, tolylazo and nitro groups where they must be different; $R^6$ is hydrogen, chlorine, bromine, nitro, methyl, trifluoromethyl, carboalkoxy, unsubstituted or substituted carbamyl or sulfamyl, a sulfonic acid aryl ester group, cyano, alkanoylamino or phenyl; $R^7$ is hydrogen, chlorine or bromine; $R^8$ and $R^9$ independently of one another are hydrogen, chlorine or bromine or together are a fused ring and $R^{10}$ is methyl, phenyl or chlorine- or methoxy-substituted phenyl, (f) from 5,6-benzoquinophthalone, (g) from 7-dialkylamino-3-benzimidazol-2-yl-coumarin, (h) from a condensate of a naphtholactam with barbituric acid or N-substituted barbituric acid, (i) from a triphenylmethane dye or xanthene dye, (k) from a phthalocyanine or (l) from violanthrone, isoviolanthrone, pyranthrone, indanthrone, naphthoylenebenzimidazole or anthraquinonebisacridone, wherein the methylene group which links the imidazole radical to the dye F is attached on one side to a carbon atom of an aromatic ring of dye F and on the other side to one of the three carbon atoms of the imidazole ring.

6. A dye as claimed in claim 5, wherein F is an n-valent radical of a dye of the formula

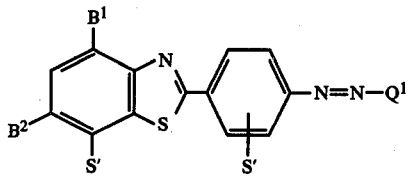

where $B^1$ is hydrogen or methyl, $B^2$ is hydrogen, methyl or ethyl, S' is hydrogen and $Q^1$ is a radical of the formula

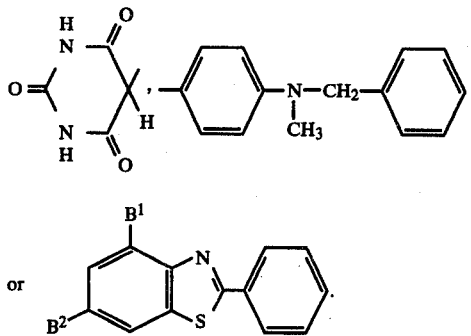

7. A dye as claimed in claim 5, wherein F is an n-valent radical of benzoquinophthalone or of copper phthalocyanine.

8. A dye as claimed in claim 1, wherein F is an n-valent radical of a dye of the formula

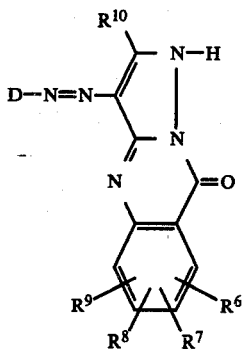

where $R^6$, $R^7$, $R^8$ and $R^9$ are hydrogen, $R^{10}$ is methyl or unsubstituted or chlorine- or methoxy-substituted phenyl and D is phenyl which is unsubstituted or substituted by 1 or 2 substituents chosen from chlorine, methoxy, methyl, nitro, phenylazo or tolylazo, the substituents (where two are present) being identical or different except in the case of the phenylazo, tolylazo and nitro groups where they must be different.

9. A dye as claimed in claim 1, wherein F is an n-valent radical of a condensate of a naphtholactam with barbituric acid or N-alkylbarbituric acid.

10. A dye as claimed in claim 1, wherein F is an n-valent radical of a coupling product of aminoazobenzene or o-aminoazotoluene with a pyrazol-5-one compound.

* * * * *

UNITED STATES PATENT AND TRADEMARK OFFICE
CERTIFICATE OF CORRECTION

PATENT NO. : 4,451,398
DATED : May 29, 1984
INVENTOR(S) : Patsch et al.

It is certified that error appears in the above-identified patent and that said Letters Patent is hereby corrected as shown below:

On the title page Item [54] should read:
- - [54] DYES CONTAINING IMIDAZOLYLMETHYLENE GROUPS - -

Signed and Sealed this

Sixteenth Day of October 1984

[SEAL]

Attest:

Attesting Officer

GERALD J. MOSSINGHOFF

Commissioner of Patents and Trademarks